(12) United States Patent  
Charlton et al.

(10) Patent No.: US 11,989,809 B2
(45) Date of Patent: May 21, 2024

(54) CODED VISION SYSTEM

(71) Applicant: Snap Inc., Santa Monica, CA (US)

(72) Inventors: Ebony James Charlton, Los Angeles, CA (US); Omer Cansizoglu, Mercer Island, WA (US); Kirk Ouimet, Orem, UT (US); Nathan Kenneth Boyd, Los Angeles, CA (US)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 18/146,878

(22) Filed: Dec. 27, 2022

(65) Prior Publication Data

US 2023/0139857 A1 May 4, 2023

Related U.S. Application Data

(63) Continuation of application No. 16/740,386, filed on Jan. 10, 2020, now Pat. No. 11,544,883, which is a
(Continued)

(51) Int. Cl.
*G06T 11/60* (2006.01)
*A63F 13/00* (2014.01)
(Continued)

(52) U.S. Cl.
CPC .............. *G06T 11/60* (2013.01); *A63F 13/00* (2013.01); *A63F 13/213* (2014.09);
(Continued)

(58) Field of Classification Search
CPC ........ G06T 11/60; A63F 13/00; A63F 13/213; A63F 13/352; A63F 13/58; A63F 13/65;
(Continued)

(56) References Cited

U.S. PATENT DOCUMENTS 5,754,939 A 5/1998 Herz et al.
5,880,731 A 3/1999 Liles et al.
(Continued)

FOREIGN PATENT DOCUMENTS

CA 2887596 A1 7/2015
CN 109863532 A 6/2019
(Continued)

OTHER PUBLICATIONS

"U.S. Appl. No. 15/667,345, Notice of Allowance dated Nov. 15, 2018", 9 pgs.
(Continued)

*Primary Examiner* — Ryan R Yang
(74) *Attorney, Agent, or Firm* — SCHWEGMAN LUNDBERG & WOESSNER, P.A.

(57) ABSTRACT

A system and method for presentation of computer vision (e.g., augmented reality, virtual reality) using user data and a user code is disclosed. A client device can detect an image feature (e.g., scannable code) in one or more images. The image feature is determined to be linked to a user account. User data from the user account can then be used to generate one or more augmented reality display elements that can be anchored to the image feature in the one or more images.

20 Claims, 16 Drawing Sheets

Related U.S. Application Data continuation of application No. 16/277,684, filed on Feb. 15, 2019, now Pat. No. 10,559,107, which is a continuation of application No. 15/667,345, filed on Aug. 2, 2017, now Pat. No. 10,242,477.

(60) Provisional application No. 62/446,753, filed on Jan. 16, 2017.

(51) Int. Cl.

| | | |
|---|---|---|
| *A63F 13/213* | (2014.01) | |
| *A63F 13/352* | (2014.01) | |
| *A63F 13/58* | (2014.01) | |
| *A63F 13/65* | (2014.01) | |
| *A63F 13/79* | (2014.01) | |
| *G06F 3/01* | (2006.01) | |
| *G06V 20/20* | (2022.01) | |
| *G06V 40/16* | (2022.01) | |
| *H04L 51/52* | (2022.01) | |
| *H04L 67/306* | (2022.01) | |
| *H04L 67/52* | (2022.01) | |
| *G06F 3/04817* | (2022.01) | |

(52) U.S. Cl.
CPC ............ *A63F 13/352* (2014.09); *A63F 13/58* (2014.09); *A63F 13/65* (2014.09); *A63F 13/79* (2014.09); *G06F 3/011* (2013.01); *G06V 20/20* (2022.01); *G06V 40/161* (2022.01); *H04L 51/52* (2022.05); *H04L 67/306* (2013.01); *H04L 67/52* (2022.05); *G06F 3/04817* (2013.01)

(58) Field of Classification Search
CPC ...... A63F 13/79; G06F 3/011; G06F 3/04817; G06V 20/20; G06V 40/161; H04L 51/52; H04L 67/306; H04L 67/52; H04L 51/10; H04L 51/04
See application file for complete search history.

(56) References Cited

U.S. PATENT DOCUMENTS

| | | | |
|---|---|---|---|
| 6,023,270 | A | 2/2000 | Brush, II et al. |
| 6,038,295 | A | 3/2000 | Mattes |
| 6,119,147 | A | 9/2000 | Toomey et al. |
| 6,158,044 | A | 12/2000 | Tibbetts |
| 6,167,435 | A | 12/2000 | Druckenmiller et al. |
| 6,205,432 | B1 | 3/2001 | Gabbard et al. |
| 6,223,165 | B1 | 4/2001 | Lauffer |
| 6,310,694 | B1 | 10/2001 | Okimoto et al. |
| 6,484,196 | B1 | 11/2002 | Maurille |
| 6,487,586 | B2 | 11/2002 | Ogilvie et al. |
| 6,665,531 | B1 | 12/2003 | Soderbacka et al. |
| 6,701,347 | B1 | 3/2004 | Ogilvie |
| 6,711,608 | B1 | 3/2004 | Ogilvie |
| 6,757,713 | B1 | 6/2004 | Ogilvie et al. |
| 6,772,195 | B1 | 8/2004 | Hatlelid et al. |
| 6,842,779 | B1 | 1/2005 | Nishizawa |
| 6,910,186 | B2 | 6/2005 | Kim |
| 6,980,909 | B2 | 12/2005 | Root et al. |
| 7,124,164 | B1 | 10/2006 | Chemtob |
| 7,149,893 | B1 | 12/2006 | Leonard et al. |
| 7,173,651 | B1 | 2/2007 | Knowles |
| 7,243,163 | B1 | 7/2007 | Friend et al. |
| 7,278,168 | B1 | 10/2007 | Chaudhury et al. |
| 7,342,587 | B2 | 3/2008 | Danzig et al. |
| 7,356,564 | B2 | 4/2008 | Hartselle et al. |
| 7,376,715 | B2 | 5/2008 | Cunningham et al. |
| 7,411,493 | B2 | 8/2008 | Smith |
| 7,468,729 | B1 | 12/2008 | Levinson |
| 7,478,402 | B2 | 1/2009 | Christensen et al. |
| 7,496,347 | B2 | 2/2009 | Puranik |
| 7,519,670 | B2 | 4/2009 | Hagale et al. |
| 7,535,890 | B2 | 5/2009 | Rojas |
| 7,607,096 | B2 | 10/2009 | Oreizy et al. |
| 7,636,755 | B2 | 12/2009 | Blattner et al. |
| 7,639,251 | B2 | 12/2009 | Gu et al. |
| 7,703,140 | B2 | 4/2010 | Nath et al. |
| 7,775,885 | B2 | 8/2010 | Van Luchene et al. |
| 7,859,551 | B2 | 12/2010 | Bulman et al. |
| 7,885,931 | B2 | 2/2011 | Seo et al. |
| 7,912,896 | B2 | 3/2011 | Wolovitz et al. |
| 7,925,703 | B2 | 4/2011 | Dinan et al. |
| 8,088,044 | B2 | 1/2012 | Tchao et al. |
| 8,095,878 | B2 | 1/2012 | Bates et al. |
| 8,096,882 | B2 | 1/2012 | Jung et al. |
| 8,108,774 | B2 | 1/2012 | Finn et al. |
| 8,117,281 | B2 | 2/2012 | Robinson et al. |
| 8,130,219 | B2 | 3/2012 | Fleury et al. |
| 8,131,597 | B2 | 3/2012 | Hudetz |
| 8,146,005 | B2 | 3/2012 | Jones et al. |
| 8,151,191 | B2 | 4/2012 | Nicol |
| 8,170,957 | B2 | 5/2012 | Richard |
| 8,199,747 | B2 | 6/2012 | Rojas et al. |
| 8,214,443 | B2 | 7/2012 | Hamburg |
| 8,238,947 | B2 | 8/2012 | Lottin et al. |
| 8,244,593 | B2 | 8/2012 | Klinger et al. |
| 8,312,097 | B1 | 11/2012 | Siegel et al. |
| 8,332,475 | B2 | 12/2012 | Rosen et al. |
| 8,384,719 | B2 | 2/2013 | Reville et al. |
| RE44,054 | E | 3/2013 | Kim |
| 8,396,708 | B2 | 3/2013 | Park et al. |
| 8,425,322 | B2 | 4/2013 | Gillo et al. |
| 8,458,601 | B2 | 6/2013 | Castelli et al. |
| 8,462,198 | B2 | 6/2013 | Lin et al. |
| 8,484,158 | B2 | 7/2013 | Deluca et al. |
| 8,495,503 | B2 | 7/2013 | Brown et al. |
| 8,495,505 | B2 | 7/2013 | Smith et al. |
| 8,504,926 | B2 | 8/2013 | Wolf |
| 8,559,980 | B2 | 10/2013 | Pujol |
| 8,564,621 | B2 | 10/2013 | Branson et al. |
| 8,564,710 | B2 | 10/2013 | Nonaka et al. |
| 8,570,907 | B2 | 10/2013 | Garcia, Jr. et al. |
| 8,581,911 | B2 | 11/2013 | Becker et al. |
| 8,597,121 | B2 | 12/2013 | del Valle |
| 8,601,051 | B2 | 12/2013 | Wang |
| 8,601,379 | B2 | 12/2013 | Marks et al. |
| 8,632,408 | B2 | 1/2014 | Gillo et al. |
| 8,648,865 | B2 | 2/2014 | Dawson et al. |
| 8,659,548 | B2 | 2/2014 | Hildreth |
| 8,683,354 | B2 | 3/2014 | Khandelwal et al. |
| 8,692,830 | B2 | 4/2014 | Nelson et al. |
| 8,718,333 | B2 | 5/2014 | Wolf et al. |
| 8,724,622 | B2 | 5/2014 | Rojas |
| 8,745,132 | B2 | 6/2014 | Obradovich |
| 8,810,513 | B2 | 8/2014 | Ptucha et al. |
| 8,812,171 | B2 | 8/2014 | Filev et al. |
| 8,832,201 | B2 | 9/2014 | Wall |
| 8,832,552 | B2 | 9/2014 | Arrasvuori et al. |
| 8,839,327 | B2 | 9/2014 | Amento et al. |
| 8,874,677 | B2 | 10/2014 | Rosen et al. |
| 8,890,926 | B2 | 11/2014 | Tandon et al. |
| 8,892,999 | B2 | 11/2014 | Nims et al. |
| 8,909,679 | B2 | 12/2014 | Root et al. |
| 8,909,714 | B2 | 12/2014 | Agarwal et al. |
| 8,909,725 | B1 | 12/2014 | Sehn |
| 8,914,752 | B1 | 12/2014 | Spiegel |
| 8,924,250 | B2 | 12/2014 | Bates et al. |
| 8,963,926 | B2 | 2/2015 | Brown et al. |
| 8,989,786 | B2 | 3/2015 | Feghali |
| 8,995,433 | B2 | 3/2015 | Rojas |
| 9,040,574 | B2 | 5/2015 | Wang et al. |
| 9,055,416 | B2 | 6/2015 | Rosen et al. |
| 9,083,770 | B1 | 7/2015 | Drose et al. |
| 9,086,776 | B2 | 7/2015 | Ye et al. |
| 9,094,137 | B1 | 7/2015 | Sehn et al. |
| 9,100,806 | B2 | 8/2015 | Rosen et al. |
| 9,100,807 | B2 | 8/2015 | Rosen et al. |
| 9,105,014 | B2 | 8/2015 | Collet et al. |
| 9,111,164 | B1 | 8/2015 | Anderton et al. |
| 9,113,301 | B1 | 8/2015 | Spiegel et al. |

(56) References Cited

U.S. PATENT DOCUMENTS

| | | |
|---|---|---|
| 9,148,424 B1 | 9/2015 | Yang |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,241,184 B2 | 1/2016 | Weerasinghe |
| 9,256,860 B2 | 2/2016 | Herger et al. |
| 9,264,463 B2 | 2/2016 | Rubinstein et al. |
| 9,276,886 B1 | 3/2016 | Samaranayake |
| 9,294,425 B1 | 3/2016 | Son |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,385,983 B1 | 7/2016 | Sehn |
| 9,396,354 B1 | 7/2016 | Murphy et al. |
| 9,402,057 B2 | 7/2016 | Kaytaz et al. |
| 9,407,712 B1 | 8/2016 | Sehn |
| 9,407,816 B1 | 8/2016 | Sehn |
| 9,412,192 B2 | 8/2016 | Mandel et al. |
| 9,430,783 B1 | 8/2016 | Sehn |
| 9,443,227 B2 | 9/2016 | Evans et al. |
| 9,460,541 B2 | 10/2016 | Li et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,489,760 B2 | 11/2016 | Li et al. |
| 9,491,134 B2 | 11/2016 | Rosen et al. |
| 9,503,845 B2 | 11/2016 | Vincent |
| 9,508,197 B2 | 11/2016 | Quinn et al. |
| 9,532,171 B2 | 12/2016 | Allen et al. |
| 9,537,811 B2 | 1/2017 | Allen et al. |
| 9,544,257 B2 | 1/2017 | Ogundokun et al. |
| 9,560,006 B2 | 1/2017 | Prado et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,628,950 B1 | 4/2017 | Noeth et al. |
| 9,648,376 B2 | 5/2017 | Chang et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,697,635 B2 | 7/2017 | Quinn et al. |
| 9,705,831 B2 | 7/2017 | Spiegel |
| 9,706,040 B2 | 7/2017 | Kadirvel et al. |
| 9,742,713 B2 | 8/2017 | Spiegel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,785,796 B1 | 10/2017 | Murphy et al. |
| 9,792,714 B2 | 10/2017 | Li et al. |
| 9,825,898 B2 | 11/2017 | Sehn |
| 9,839,844 B2 | 12/2017 | Dunstan et al. |
| 9,854,219 B2 | 12/2017 | Sehn |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,961,520 B2 | 5/2018 | Brooks et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,362,219 B2 | 7/2019 | Wilson et al. |
| 10,475,225 B2 | 11/2019 | Park et al. |
| 10,484,328 B2 | 11/2019 | Kimura et al. |
| 10,504,266 B2 | 12/2019 | Blattner et al. |
| 10,534,949 B1 | 1/2020 | Anderton et al. |
| 10,559,107 B1 | 2/2020 | Charlton et al. |
| 10,573,048 B2 | 2/2020 | Ni et al. |
| 10,657,701 B2 | 5/2020 | Osman et al. |
| 11,544,883 B1 | 1/2023 | Charlton et al. |
| 2002/0047868 A1 | 4/2002 | Miyazawa |
| 2002/0067362 A1 | 6/2002 | Agostino Nocera et al. |
| 2002/0144154 A1 | 10/2002 | Tomkow |
| 2002/0169644 A1 | 11/2002 | Greene |
| 2003/0052925 A1 | 3/2003 | Daimon et al. |
| 2003/0126215 A1 | 7/2003 | Udell |
| 2003/0217106 A1 | 11/2003 | Adar et al. |
| 2004/0203959 A1 | 10/2004 | Coombes |
| 2005/0097176 A1 | 5/2005 | Schatz et al. |
| 2005/0162419 A1 | 7/2005 | Kim et al. |
| 2005/0198128 A1 | 9/2005 | Anderson |
| 2005/0206610 A1 | 9/2005 | Cordelli |
| 2005/0223066 A1 | 10/2005 | Buchheit et al. |
| 2006/0242239 A1 | 10/2006 | Morishima et al. |
| 2006/0270419 A1 | 11/2006 | Crowley et al. |
| 2006/0294465 A1 | 12/2006 | Ronen et al. |
| 2007/0038715 A1 | 2/2007 | Collins et al. |
| 2007/0064899 A1 | 3/2007 | Boss et al. |
| 2007/0073823 A1 | 3/2007 | Cohen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2007/0214216 A1 | 9/2007 | Carrer et al. |
| 2007/0233801 A1 | 10/2007 | Eren et al. |
| 2008/0055269 A1 | 3/2008 | Lemay et al. |
| 2008/0120409 A1 | 5/2008 | Sun et al. |
| 2008/0158222 A1 | 7/2008 | Li et al. |
| 2008/0158232 A1 | 7/2008 | Shuster |
| 2008/0195699 A1 | 8/2008 | Min et al. |
| 2008/0207176 A1 | 8/2008 | Brackbill et al. |
| 2008/0270938 A1 | 10/2008 | Carlson |
| 2008/0306826 A1 | 12/2008 | Kramer et al. |
| 2008/0313346 A1 | 12/2008 | Kujawa et al. |
| 2009/0016617 A1 | 1/2009 | Bregman-amitai et al. |
| 2009/0042588 A1 | 2/2009 | Lottin et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0132453 A1 | 5/2009 | Hangartner et al. |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0082427 A1 | 4/2010 | Burgener et al. |
| 2010/0115426 A1 | 5/2010 | Liu et al. |
| 2010/0131880 A1 | 5/2010 | Lee et al. |
| 2010/0162149 A1 | 6/2010 | Sheleheda et al. |
| 2010/0185665 A1 | 7/2010 | Horn et al. |
| 2010/0203968 A1 | 8/2010 | Gill et al. |
| 2010/0227682 A1 | 9/2010 | Reville et al. |
| 2010/0306669 A1 | 12/2010 | Della Pasqua |
| 2011/0093780 A1 | 4/2011 | Dunn |
| 2011/0099507 A1 | 4/2011 | Nesladek et al. |
| 2011/0115798 A1 | 5/2011 | Nayar et al. |
| 2011/0145564 A1 | 6/2011 | Moshir et al. |
| 2011/0148864 A1 | 6/2011 | Lee et al. |
| 2011/0202598 A1 | 8/2011 | Evans et al. |
| 2011/0213845 A1 | 9/2011 | Logan et al. |
| 2011/0239136 A1 | 9/2011 | Goldman et al. |
| 2011/0286586 A1 | 11/2011 | Saylor et al. |
| 2011/0320373 A1 | 12/2011 | Lee et al. |
| 2012/0028659 A1 | 2/2012 | Whitney et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2012/0184248 A1 | 7/2012 | Speede |
| 2012/0209921 A1 | 8/2012 | Adafin et al. |
| 2012/0209924 A1 | 8/2012 | Evans et al. |

(56) References Cited

U.S. PATENT DOCUMENTS

| | | |
|---|---|---|
| 2012/0254325 A1 | 10/2012 | Majeti et al. |
| 2012/0278692 A1 | 11/2012 | Shi |
| 2012/0304080 A1 | 11/2012 | Wormald et al. |
| 2013/0071093 A1 | 3/2013 | Hanks et al. |
| 2013/0103760 A1 | 4/2013 | Golding et al. |
| 2013/0194301 A1 | 8/2013 | Robbins et al. |
| 2013/0201187 A1 | 8/2013 | Tong et al. |
| 2013/0249948 A1 | 9/2013 | Reitan |
| 2013/0257877 A1 | 10/2013 | Davis |
| 2013/0290443 A1 | 10/2013 | Collins et al. |
| 2014/0032682 A1 | 1/2014 | Prado et al. |
| 2014/0043329 A1 | 2/2014 | Wang et al. |
| 2014/0055554 A1 | 2/2014 | Du et al. |
| 2014/0122787 A1 | 5/2014 | Shalvi et al. |
| 2014/0125678 A1 | 5/2014 | Wang et al. |
| 2014/0129343 A1 | 5/2014 | Finster et al. |
| 2014/0201527 A1 | 7/2014 | Krivorot |
| 2014/0282096 A1 | 9/2014 | Rubinstein et al. |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2015/0199082 A1 | 7/2015 | Scholler et al. |
| 2015/0206349 A1 | 7/2015 | Rosenthal et al. |
| 2015/0227602 A1 | 8/2015 | Ramu et al. |
| 2016/0085773 A1 | 3/2016 | Chang et al. |
| 2016/0085863 A1 | 3/2016 | Allen et al. |
| 2016/0086670 A1 | 3/2016 | Gross et al. |
| 2016/0099901 A1 | 4/2016 | Allen et al. |
| 2016/0134840 A1 | 5/2016 | Mcculloch |
| 2016/0180887 A1 | 6/2016 | Sehn |
| 2016/0234149 A1 | 8/2016 | Tsuda et al. |
| 2016/0277419 A1 | 9/2016 | Allen et al. |
| 2016/0321708 A1 | 11/2016 | Sehn |
| 2016/0352818 A1 | 12/2016 | Han et al. |
| 2016/0359957 A1 | 12/2016 | Laliberte |
| 2016/0359987 A1 | 12/2016 | Laliberte |
| 2017/0080346 A1 | 3/2017 | Abbas |
| 2017/0083172 A1* | 3/2017 | Schneider, IV ..... G06F 3/04812 |
| 2017/0087473 A1 | 3/2017 | Siegel et al. |
| 2017/0112140 A1 | 4/2017 | Bergman et al. |
| 2017/0113140 A1 | 4/2017 | Blackstock et al. |
| 2017/0118145 A1 | 4/2017 | Aittoniemi et al. |
| 2017/0161382 A1 | 6/2017 | Ouimet et al. |
| 2017/0199855 A1 | 7/2017 | Fishbeck |
| 2017/0235848 A1 | 8/2017 | Van Dusen et al. |
| 2017/0263029 A1 | 9/2017 | Yan et al. |
| 2017/0287006 A1 | 10/2017 | Azmoodeh et al. |
| 2017/0295250 A1 | 10/2017 | Samaranayake et al. |
| 2017/0310934 A1 | 10/2017 | Du et al. |
| 2017/0312634 A1 | 11/2017 | Ledoux et al. |
| 2017/0374003 A1 | 12/2017 | Allen et al. |
| 2017/0374508 A1 | 12/2017 | Davis et al. |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0026559 A1* | 1/2019 | Zhan ..................... G06F 3/147 |
| 2019/0057616 A1 | 2/2019 | Cohen et al. |
| 2019/0102339 A1 | 4/2019 | Wang et al. |
| 2019/0102928 A1 | 4/2019 | Blackshaw et al. |
| 2019/0188920 A1 | 6/2019 | Mcphee et al. |

FOREIGN PATENT DOCUMENTS

| | | | |
|---|---|---|---|
| CN | 110168478 A | 8/2019 | |
| EP | 2184092 A2 | 5/2010 | |
| JP | 2001230801 A | 8/2001 | |
| JP | 2005196780 A | 7/2005 | |
| JP | 5497931 B2 | 3/2014 | |
| JP | 2016508252 A * | 3/2016 | ............. H04L 67/02 |
| KR | 20040020098 A | 3/2004 | |
| KR | 101445263 B1 | 9/2014 | |
| KR | 101647305 B1 | 8/2016 | |
| WO | WO-2003094072 A1 | 11/2003 | |
| WO | WO-2004095308 A1 | 11/2004 | |
| WO | WO-2006107182 A1 | 10/2006 | |
| WO | WO-2007134402 A1 | 11/2007 | |
| WO | WO-2012000107 A1 | 1/2012 | |
| WO | WO-2012139276 A1 | 10/2012 | |
| WO | WO-2013008251 A2 | 1/2013 | |
| WO | WO-2013027893 A1 | 2/2013 | |
| WO | WO-2013152454 A1 | 10/2013 | |
| WO | WO-2013166588 A1 | 11/2013 | |
| WO | WO-2014031899 A1 | 2/2014 | |
| WO | WO-2014194262 A2 | 12/2014 | |
| WO | WO-2014194439 A1 | 12/2014 | |
| WO | WO-2015192026 A1 | 12/2015 | |
| WO | WO-2016054562 A1 | 4/2016 | |
| WO | WO-2016065131 A1 | 4/2016 | |
| WO | WO-2016090605 A1 | 6/2016 | |
| WO | WO-2016/112299 A1 | 7/2016 | |
| WO | WO-2016179166 A1 | 11/2016 | |
| WO | WO-2016179235 A1 | 11/2016 | |
| WO | WO-2017176739 A1 | 10/2017 | |
| WO | WO-2017176992 A1 | 10/2017 | |
| WO | WO-2018005644 A1 | 1/2018 | |
| WO | WO-2018081013 A1 | 5/2018 | |
| WO | WO-2018102562 A1 | 6/2018 | |
| WO | WO-2018129531 A1 | 7/2018 | |
| WO | WO-2019089613 A1 | 5/2019 | |

OTHER PUBLICATIONS

"U.S. Appl. No. 16/277,684, Non Final Office Action dated Jun. 14, 2019", 8 pgs.

"U.S. Appl. No. 16/277,684, Notice of Allowance dated Oct. 3, 2019", 10 pgs.

"U.S. Appl. No. 16/277,684, Response filed Sep. 16, 2019 to Non-Final Office Action dated Jun. 14, 2019", 9 pgs.

"U.S. Appl. No. 16/740,386, Final Office Action dated Feb. 16, 2021", 13 pgs.

"U.S. Appl. No. 16/740,386, Final Office Action dated Dec. 29, 2021", 14 pgs.

"U.S. Appl. No. 16/740,386, Non Final Office Action dated Apr. 28, 2022", 14 pgs.

"U.S. Appl. No. 16/740,386, Non Final Office Action dated Jun. 30, 2021", 13 pgs.

"U.S. Appl. No. 16/740,386, Non Final Office Action dated Aug. 21, 2020", 19 pgs.

"U.S. Appl. No. 16/740,386, Notice of Allowance dated Sep. 6, 2022".

"U.S. Appl. No. 16/740,386, Preliminary Amendment filed May 4, 2020", 7 pgs.

"U.S. Appl. No. 16/740,386, Response filed Mar. 29, 2022 to Final Office Action dated Dec. 29, 2021", 11 pgs.

"U.S. Appl. No. 16/740,386, Response filed May 17, 2021 to Final Office Action dated Feb. 16, 2021", 10 pages.

"U.S. Appl. No. 16/740,386, Response filed Jul. 27, 2022 to Non Final Office Action dated Apr. 28, 2022", 11 pgs.

"U.S. Appl. No. 16/740,386, Response filed Sep. 30, 2021 to Non Final Office Action dated Jun. 30, 2021", 10 pgs.

"U.S. Appl. No. 16/740,386, Response filed Nov. 19, 2020 to Non Final Office Action dated Aug. 21, 2020", 12 pgs.

Castelluccia, Claude, et al., "EphPub: Toward robust Ephemeral Publishing", 19th IEEE International Conference on Network Protocols (ICNP), (Oct. 17, 2011), 18 pgs.

Fajman, "An Extensible Message Format for Message Disposition Notifications", Request for Comments: 2298, National Institutes of Health, (Mar. 1998), 28 pgs.

Leyden, John, "This SMS will self-destruct in 40 seconds", [Online] Retrieved from the Internet: < URL: http://www.theregister.co.uk/2005/12/12/stealthtext/>, (Dec. 12, 2005), 1 pg.

Melanson, Mike, "This text message will self destruct in 60 seconds", [Online] Retrieved from the Internet: < URL: http://readwrite.com/2011/02/11/this_text_message_will_self_destruct_in_60_seconds>, (Feb. 18, 2015), 4 pgs.

(56) References Cited

OTHER PUBLICATIONS

Sawers, Paul, "Snapchat for iOS Lets You Send Photos to Friends and Set How long They're Visible For", [Online] Retrieved from the Internet: <URL: https://thenextweb.com/news/snapchat-for-ios-lets-you-send-photos-to-friends-and-set-how-long-theyre-visible-for>, (May 7, 2012), 5 pgs.

Shein, Esther, "Ephemeral Data", Communications of the ACM, vol. 56, No. 9, (Sep. 2013), 3 pgs.

Vaas, Lisa, "StealthText, Should You Choose to Accept It", [Online] Retrieved from the Internet: <URL: https://www.eweek.com/enterprise-apps/stealthtext-should-you-choose-to-accept-it/>, (Dec. 13, 2005), 3 pgs.

U.S. Appl. No. 18/388,977, filed Nov. 13, 2023.

\* cited by examiner

US 11,989,809 B2

CODED VISION SYSTEM

RELATED APPLICATIONS

This application is a continuation of and claims the priority benefit of U.S. patent application Ser. No. 16/740,386, filed Jan. 10, 2020, which is a continuation of and claims the priority benefit of U.S. patent application Ser. No. 16/277,684, filed Feb. 15, 2019, which is a continuation of and claims the priority benefit of U.S. patent application Ser. No. 15/667,345, filed Aug. 2, 2017, which claims the priority benefit of U.S. Provisional Application Ser. No. 62/446,753, filed Jan. 16, 2017, each of which are hereby incorporated by reference in their entireties.

TECHNICAL FIELD

Embodiments of the present disclosure relate generally to virtual display and, more particularly, but not by way of limitation, to computer vision using coded user data.

BACKGROUND

Client devices, such as smartphones, have image sensors that enable users to view their environments through displays of the client devices. However, users cannot currently use their social media content to interact with each other through the displays.

BRIEF DESCRIPTION OF THE DRAWINGS

To easily identify the discussion of any particular element or act, the most significant digit or digits in a reference number refer to the figure ("FIG.") number in which that element or act is first introduced.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

According to some example embodiments, a first user can display an object using an image sensor of a client device (e.g., smartphone). The object is recognized as a scannable code linked to a second user's social media account or avatar user account (e.g., Bitmoji® account). A first avatar for the first user is then arranged to appear interacting with a second avatar of the second user. The arrangement of the two interacting avatars may be pre-configured based on characteristics of the first avatar, the second avatar, or their relationship on a social media platform. In some example embodiments, when the object is recognized as linked to a given user's account, social media content (e.g., user images) is integrated into a image display as augmented reality elements. For example, a user can scan a code of another user, and the live video feed displayed on the user's phone can appear to have bubbles emanating from the code in the live video feed. The avatars or other augmented reality elements can be positionally anchored to the code in the live video feed. Further actions may be triggered by scanning the code, such as prompting a popup menu to add the user that corresponds to the scanned code or install an app linked on the server side to a company associated with the scanned code.

Figure 1:
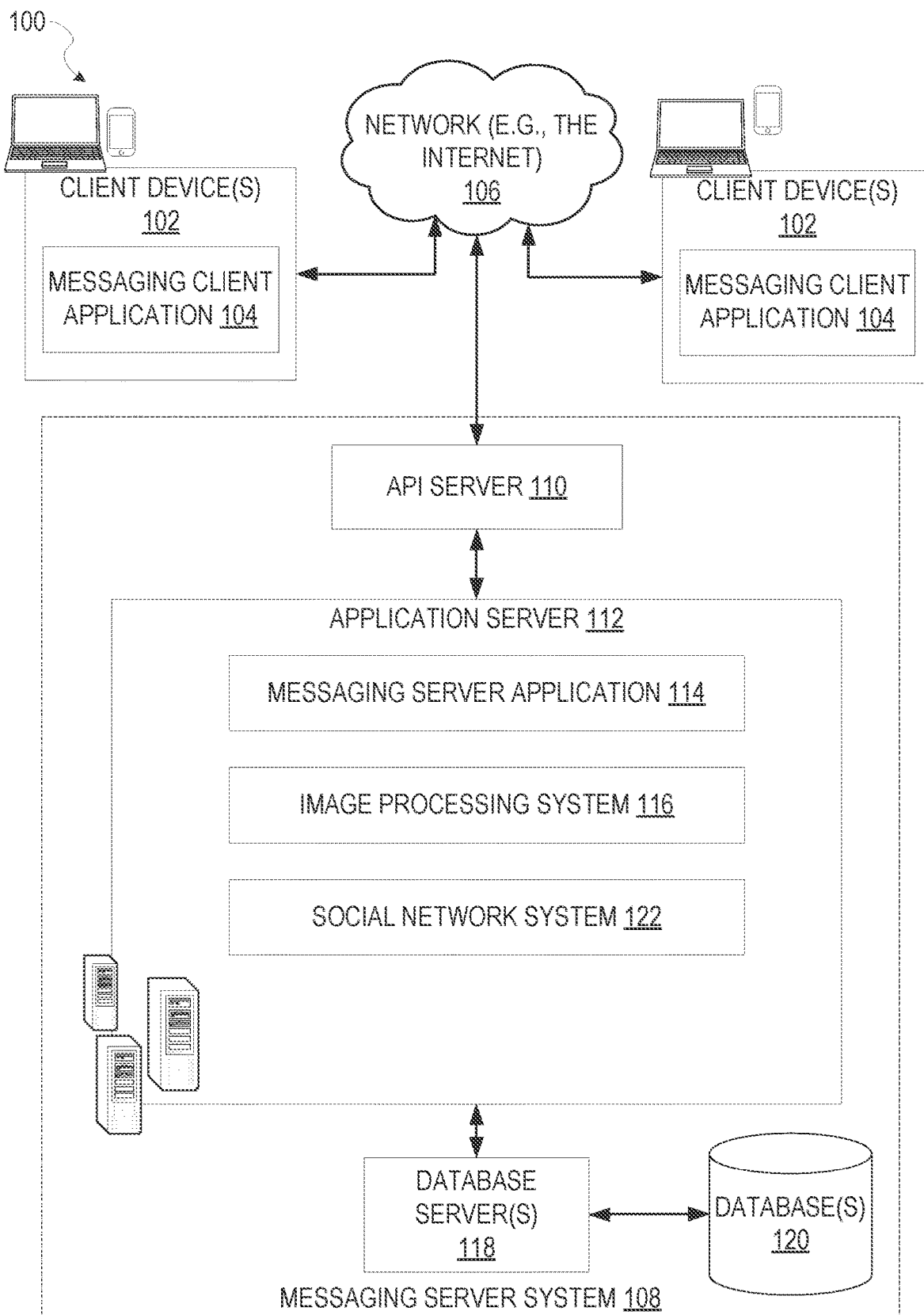
FIG. 1 is a block diagram showing an example messaging system for exchanging data (e.g., messages and associated content) over a network.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Programming Interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client devices 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114 for possible access by another messaging client application 104; the setting of a collection of media data (e.g., a story); the retrieval of such collections; the retrieval of a list of friends of a user of a client device 102; the retrieval of messages and content; the adding and deletion of friends to and from a social graph; the location of friends within the social graph; and opening application events (e.g., relating to the messaging client application 104).

The application server 112 hosts a number of applications and subsystems, including the messaging server application 114, an image processing system 116, and a social network system 122. The messaging server application 114 implements a number of message-processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services and makes these functions and services available to the messaging server application 114. To this end, the social network system 122 maintains and accesses an entity graph (e.g., entity graph 304 in FIG. 3) within the database 120. Examples of functions and services supported by the social network system 122 include the identification of other users of the messaging system 100 with whom a particular user has relationships or whom the particular user is "following," and also the identification of other entities and interests of a particular user.

The application server 112 is communicatively coupled to a database server 118, which facilitates access to a database 120 in which is stored data associated with messages processed by the messaging server application 114.

Figure 2:
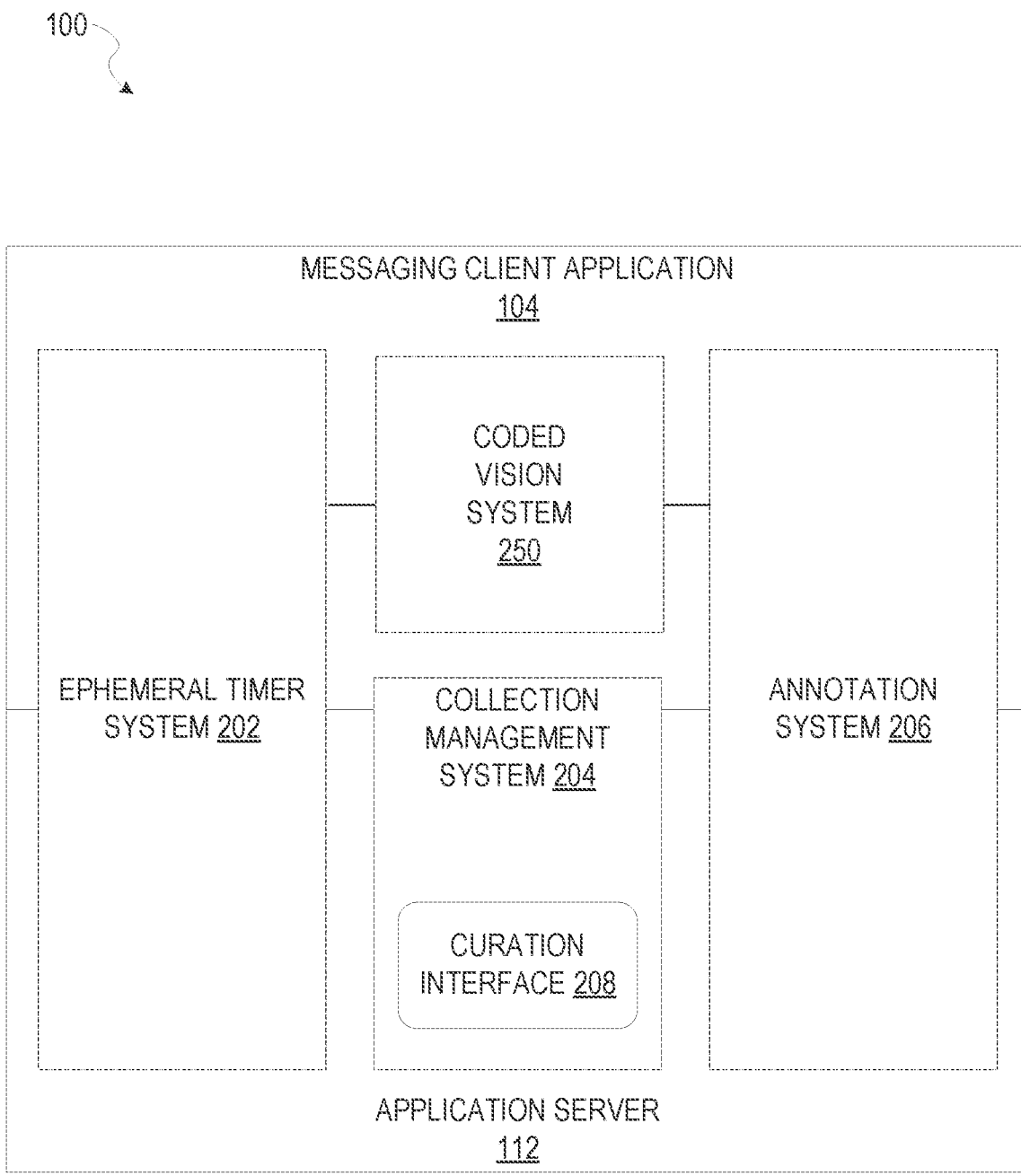
FIG. 2 is block diagram illustrating further details regarding a messaging system having an integrated virtual object machine learning system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, an annotation system 206, and a coded vision system 250.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message or collection of messages (e.g., a SNAPCHAT Story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT Geofilter or filter) to the messaging client application based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database and accessed through the database server 118.

In one example embodiment, the annotation system 206 provides a user-based publication platform that enables users to select a geolocation on a map and upload content associated with the selected geolocation. The user may also specify circumstances under which particular content should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system associates the media overlay of a highest-bidding merchant with a corresponding geolocation for a predefined amount of time.

The coded vision system 250 manages tracking an object in different images, according to some example embodiments. Further details of the coded vision system 250 are discussed below with reference to FIGS. 6-11. Although the coded vision system 250 is illustrated in FIG. 2 as being integrated into the messaging client application 104, it is appreciated that in some example embodiments, the coded vision system 250 is integrated into other systems, such as the application server 112. Further, in some example embodiments, some engines of the coded vision system 250 may be integrated into the application server 112 (e.g., to provide server side support to client generated requests) and some may be integrated into the client device 102 (e.g., to generate requests).

Figure 3:
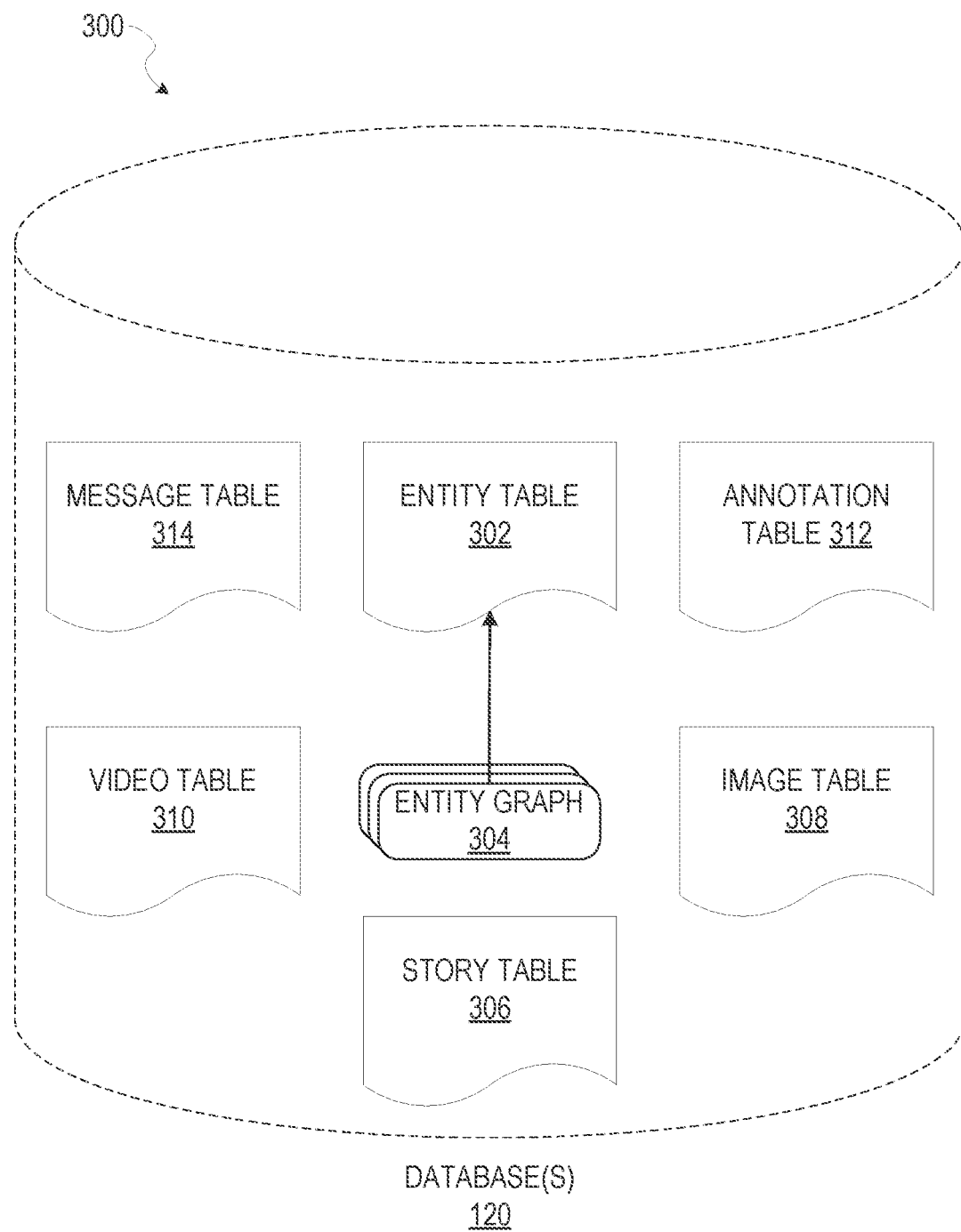
FIG. 3 is a schematic diagram illustrating data which may be stored in a database of a messaging server system, according to certain example embodiments.

FIG. 3 is a schematic diagram illustrating data 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interested-based, or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video. In some example embodiments, the lens is stored as lens metadata which is retrievable as content 1135, discussed in further detail below.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a SNAPCHAT Story or a gallery). The creation of a particular collection may be initiated by a particular user (e.g., each user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location or event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
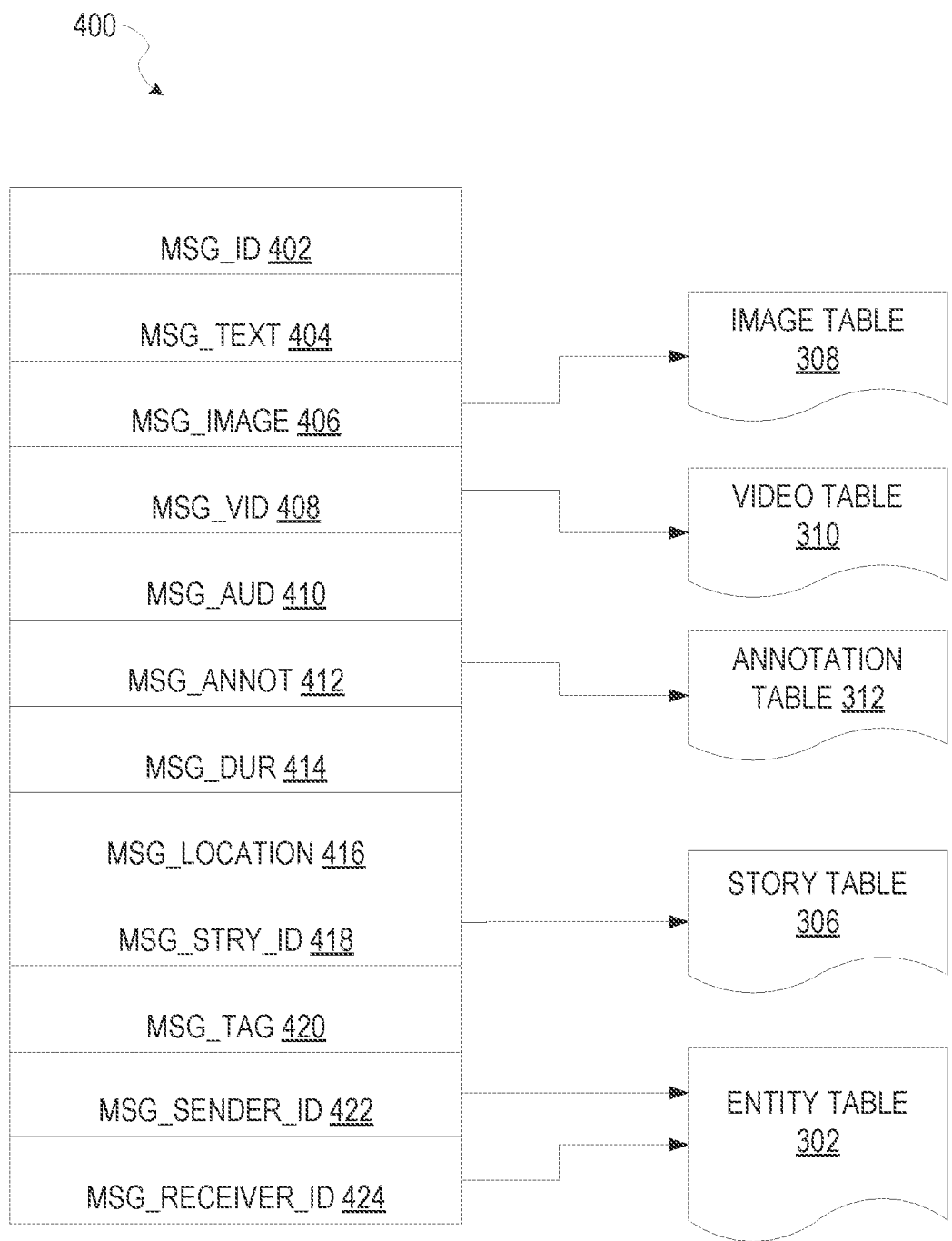
FIG. 4 is a schematic diagram illustrating a structure of a message, according to some embodiments, generated by a messaging client application for communication.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text to be generated by a user via a user interface of the client device 102 and that is included in the message 400.

A message image payload 406: image data captured by a camera component of a client device 102 or retrieved from memory of a client device 102 and included in the message 400.

A message video payload 408: video data captured by a camera component or retrieved from a memory component of the client device 102 and included in the message 400.

A message audio payload 410: audio data captured by a microphone or retrieved from the memory component of the client device 102 and included in the message 400.

Message annotations 412: annotation data (e.g., filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, and message audio payload 410) is to be presented or made accessible to a user via the messaging client application 104.

A message geolocation parameter 416: geolocation data (e.g., latitudinal and longitudinal coordinates) associated with the content payload of the message 400. Multiple message geolocation parameter 416 values may be included in the payload, with each of these parameter values being associated with respective content items included in the content (e.g., a specific image in the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: one or more tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within the image table 308. Similarly, values within the message video payload 408 may point to data stored within the video table 310, values stored within the message annotations 412 may point to data stored in the annotation table 312, values stored within the message story identifier 418 may point to data stored in the story table 306, and values stored within the message sender identifier 422 and the message receiver identifier 424 may point to user records stored within the entity table 302.

Figure 5:
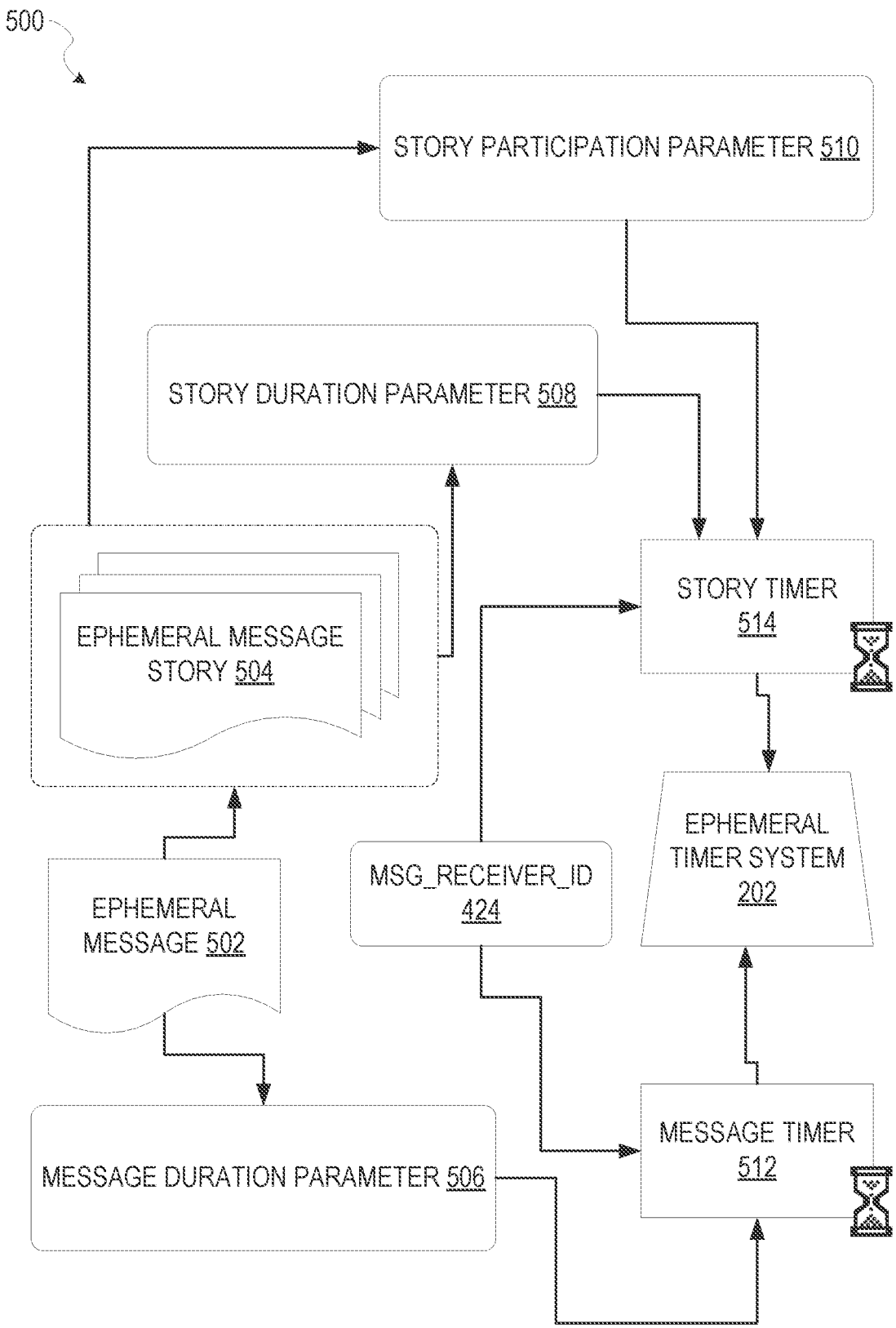
FIG. 5 is a schematic diagram illustrating an example access-limiting process, in terms of which access to content (e.g., an ephemeral message and associated multimedia payload of data) or a content collection (e.g., an ephemeral message story) may be time-limited (e.g., made ephemeral).

FIG. 5 is a schematic diagram illustrating an access-limiting process 500, in terms of which access to content (e.g., an ephemeral message 502, and associated multimedia payload of data) or a content collection (e.g., an ephemeral message story 504), may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is a SNAPCHAT application client, an ephemeral message 502 is viewable by a receiving user for up to a maximum of seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal SNAPCHAT Story, or an event story). The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time period specified by the story duration parameter 508. In a further embodiment, a certain ephemeral message 502 may expire, within the context of the ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story itself has expired in terms of the story duration parameter 508.

In certain use cases, a creator of a particular ephemeral message story 504 may specify an indefinite story duration parameter 508. In this case, the expiration of the story participation parameter for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

In response to the ephemeral timer system 202 determining that an ephemeral message story 504 has expired (e.g., is no longer accessible), the ephemeral timer system 202 communicates with the messaging system 100 (e.g., specifically, the messaging client application 104) to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message has expired, the ephemeral timer system 202 causes the messaging client application 104 to no longer display an indicium (e.g., an icon or textual identification) associated with the ephemeral message 502.

Figure 6:
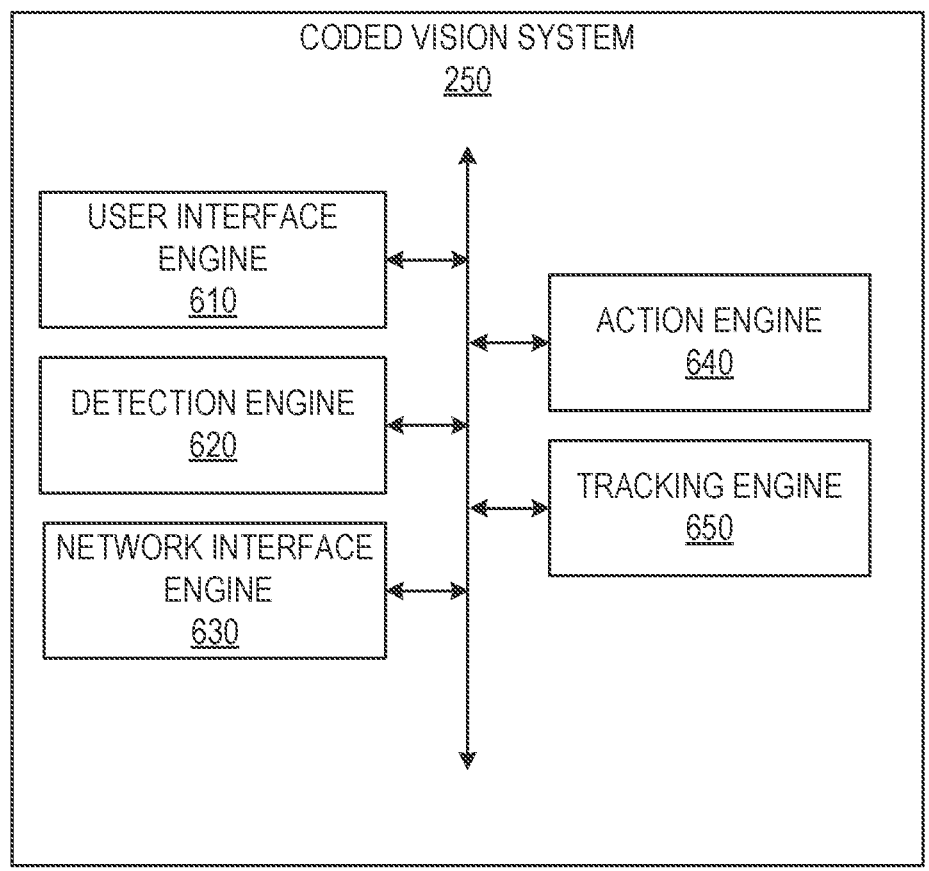
FIG. 6 shows internal functional components of a coded vision system, according to some example embodiments.

FIG. 6 shows internal functional components of a coded vision system 250, according to some example embodiments. The components themselves are communicatively coupled (e.g., via appropriate interfaces) to each other and to various data sources, so as to allow information to be passed between the applications or so as to allow the applications to share and access common data. Furthermore, the components access the database 120 via the database server 118. As illustrated, the coded vision system 250 comprises a user interface engine 610, a detection engine 620, a network interface engine 630, an action engine 640, and the tracking engine 650. The user interface engine 610 manages generating user interface elements for display on the client device. Further, the user interface engine 610 manages receiving user interface actions through an input/output (I/O) device of the client device, such as a touch screen. The detection engine 620 manages scanning the live feed images and detecting different shapes or codes depicted in the live feed. The network interface engine 630 is configured to send requests for content to a server, such as coded vision system 250, according to some example embodiments. The action engine 640 is configured to generate augmented reality elements using user data from an account that is identified using the image feature. In some example embodiments, the action engine 640 is located on a server (e.g., in coded vision system 250), as discussed with reference to FIG. 11 below. The tracking engine 650 manages tracking the image feature in the live feed and anchoring the augmented reality elements with respect to the image feature.

Figure 7:
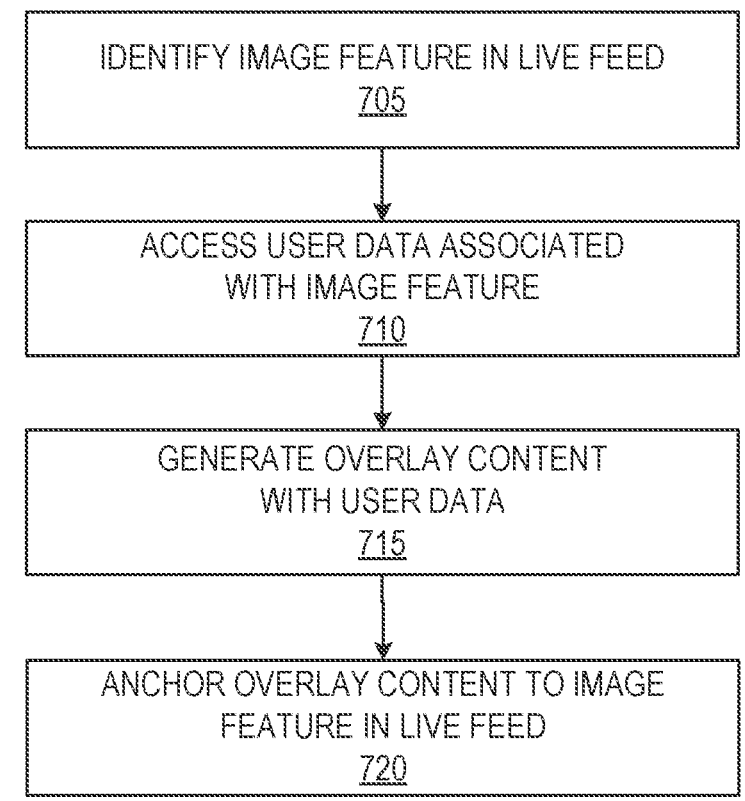
FIG. 7 shows a flow diagram for a method of implementing computer vision using coded user data, according to some example embodiments.

FIG. 7 shows a flow diagram for a method 700 of implementing augmented reality using coded user data, according to some example embodiments. At operation 705, the detection engine identifies an image feature in a live feed. At operation 710, the network interface engine 630 accesses user data associated with the detected image feature. At operation 715, action engine 640 generates overlay content with the user data. In some embodiments, at operation 715, the action engine 640 receives the overlay content from a server configured to generate the overlay content, as discussed in further detail below. At operation 720, the action engine 640 anchors the overlay content to the image feature in the live feed.

Figure 8A:
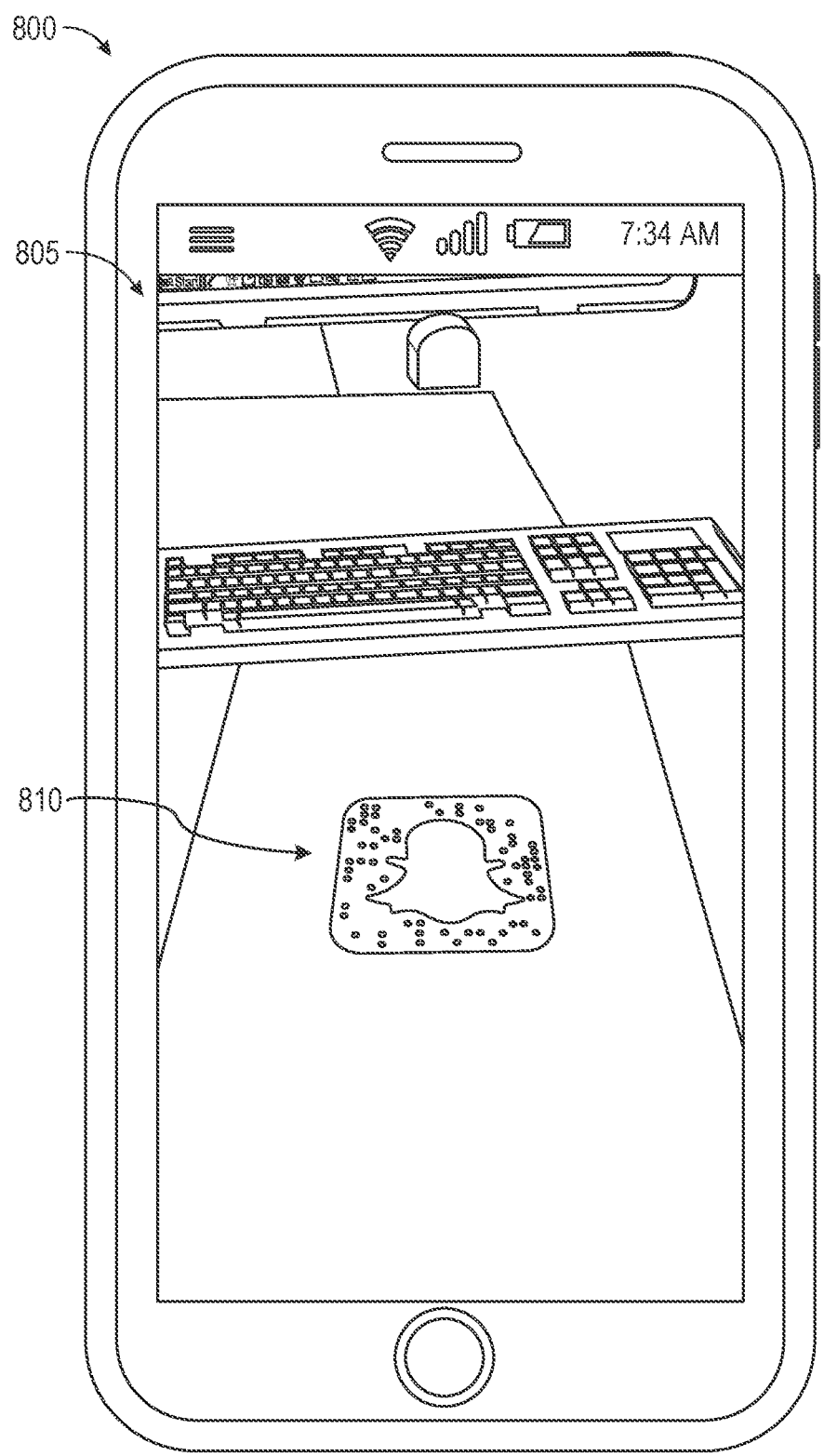
FIGS. 8A and 8B show example user interfaces of computer vision using coded user data, according to some example embodiments.
Figure 8B:
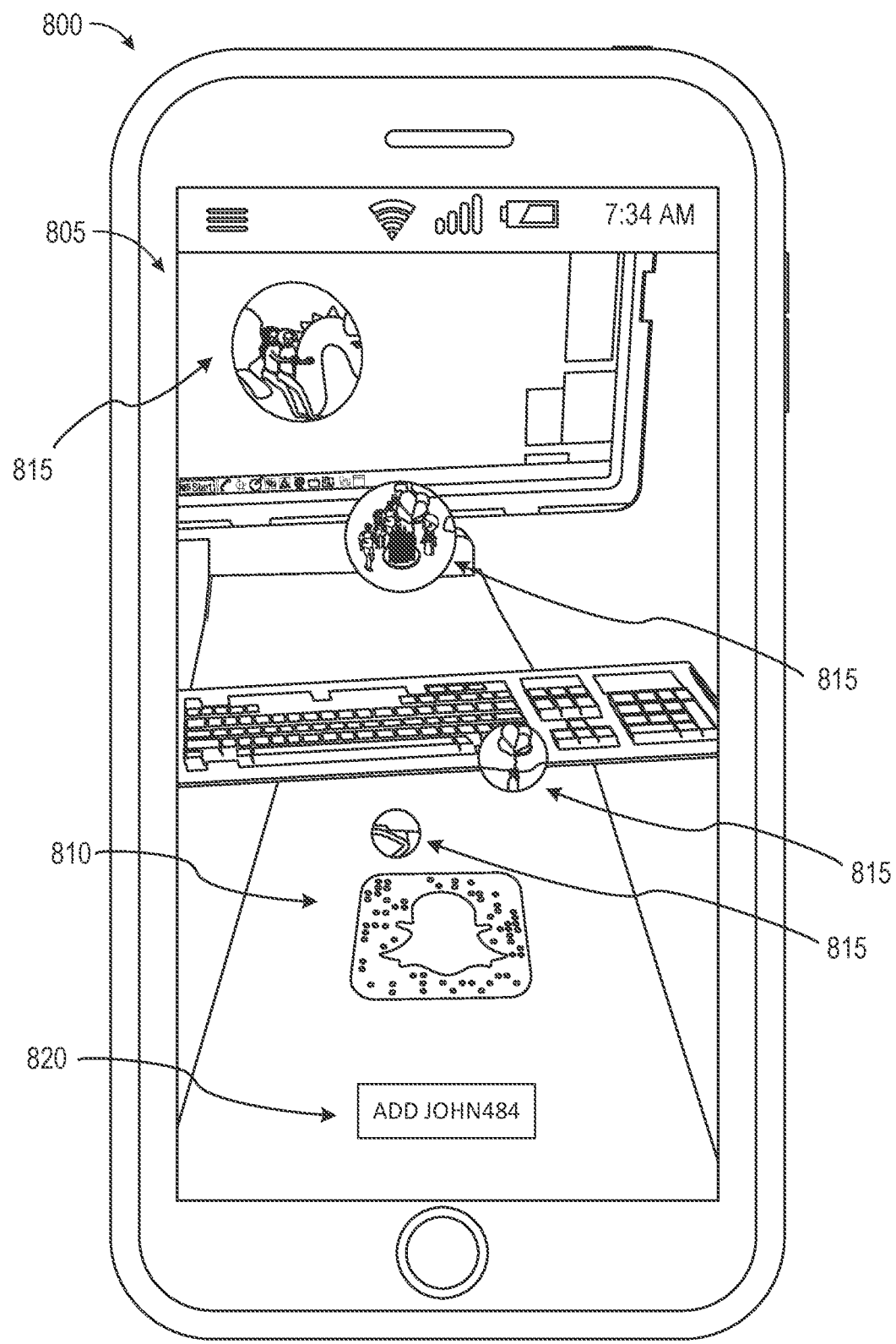

FIGS. 8A and 8B show an example of a client device performing the method 700 of FIG. 7, according to some example embodiments. In particular, FIG. 8A shows a client device 800 displaying a user interface 805 for implementing augmented reality using coded user data. The user interface 805 is generated by the user interface engine 610 from a client application (e.g., coded vision system 250) executing on the client device 800, according to some embodiments. As illustrated, the user interface 805 is displaying one or more frames (e.g., live video) from a camera on the backside (not depicted) of client device 800. In the one or more frames, an image feature 810 is depicted. In some example embodiments, the image feature is coded with dots, lines, or other types of coding that the detection engine can use to identify a user associated with the image feature 810. Further details of an example approaches using image features are described in: application Ser. No. 15/262,942, titled "PRESENTING AN AUGMENTED REALITY WITHIN A CUSTOM GRAPHIC," filed on Sep. 12, 2016; U.S. Pat. No. 9,111,164, titled "CUSTOM FUNCTIONAL PATTERNS FOR OPTICAL BARCODES," filed on Jan. 19, 2015; application Ser. No. 14/595,712, titled "GUIDED PERSONAL IDENTITY BASED ACTIONS," filed on Jan. 13, 2015; and application Ser. No. 15/074,629, titled "FACIAL PATTERNS FOR OPTICAL BARCODES," filed on Jan. 19, 2015; which are hereby incorporated by reference in entirety.

FIG. 8B shows the client device 800 with the user interface displaying augmented reality elements, according to some example embodiments. After the image feature is scanned and the coding is used to identify a corresponding user and user profile on the application server 112, the coded vision system 250 uses user data stored in the user profile (e.g., stored in database 120) to generate overlay content for the live feed. In the example shown, image post data (e.g., images from ephemeral messages 502 published by the user over social media) are used to populate one or more bubbles 815. The one or more bubbles 815 are part of an animation sequence that depicts the bubbles as emanating from the image feature 810, according to some example embodiments.

Further, upon the image feature being scanned and the user profile being identified, a add button 820 can be shown with the overlay content. The add button 820 allows the user operating client device 800 (not depicted) to add the user whose image feature was scanned as a friend on the social graph. After the users are friends, they may then exchange ephemeral messages 502 using their respective message client applications (e.g., message client app 504).

Figure 9:
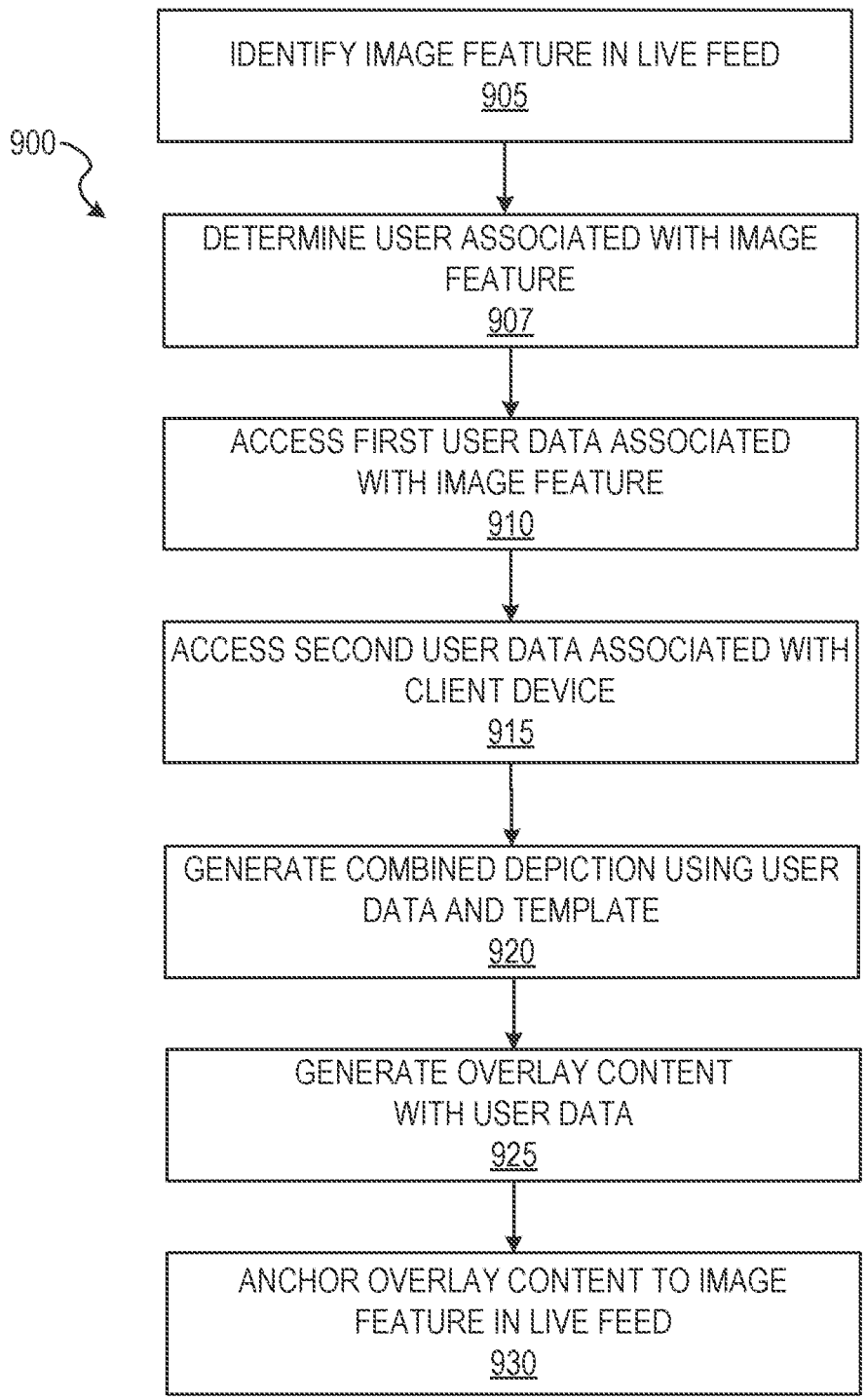
FIG. 9 shows a flow diagram for a method for implementing augmented reality using user data and a coded image feature, according to some example embodiments.

FIG. 9 shows a flow diagram for a method 900 for implementing augmented reality using user data and a coded image feature, according to some example embodiments. At operation 905, the detection engine 620 identifies an image feature in a live feed. At operation 907, the detection engine 620 determines that the image feature is associated with a user profile of a first user. At operation 910, the network interface engine 630 accesses the first user's user data on a server, e.g., application server 112. At operation 915, the network interface engine 630 accesses a second user's user data on the server. The second user is the user that is operating the coded vision system through another the client device. At operation 920, the action engine 640 generates a combined depiction that shows the user data of the first user interacting with user data of the second user. At operation 925, the action engine 640 overlays the combined depiction over the live feed. At operation 930, the action engine 640 anchors the combined depiction to the image feature in the live feed. For example, the combined depiction is anchored to the image feature such that when the client device is moved to view the image feature from different angles, the combined depiction keeps its position with respect to the image feature in the live feed. FIGS. 10B and 10C, discussed below, further show an example of anchoring a combined depiction as the client device (a smartphone) is rotated around the image feature.

Figure 10A:
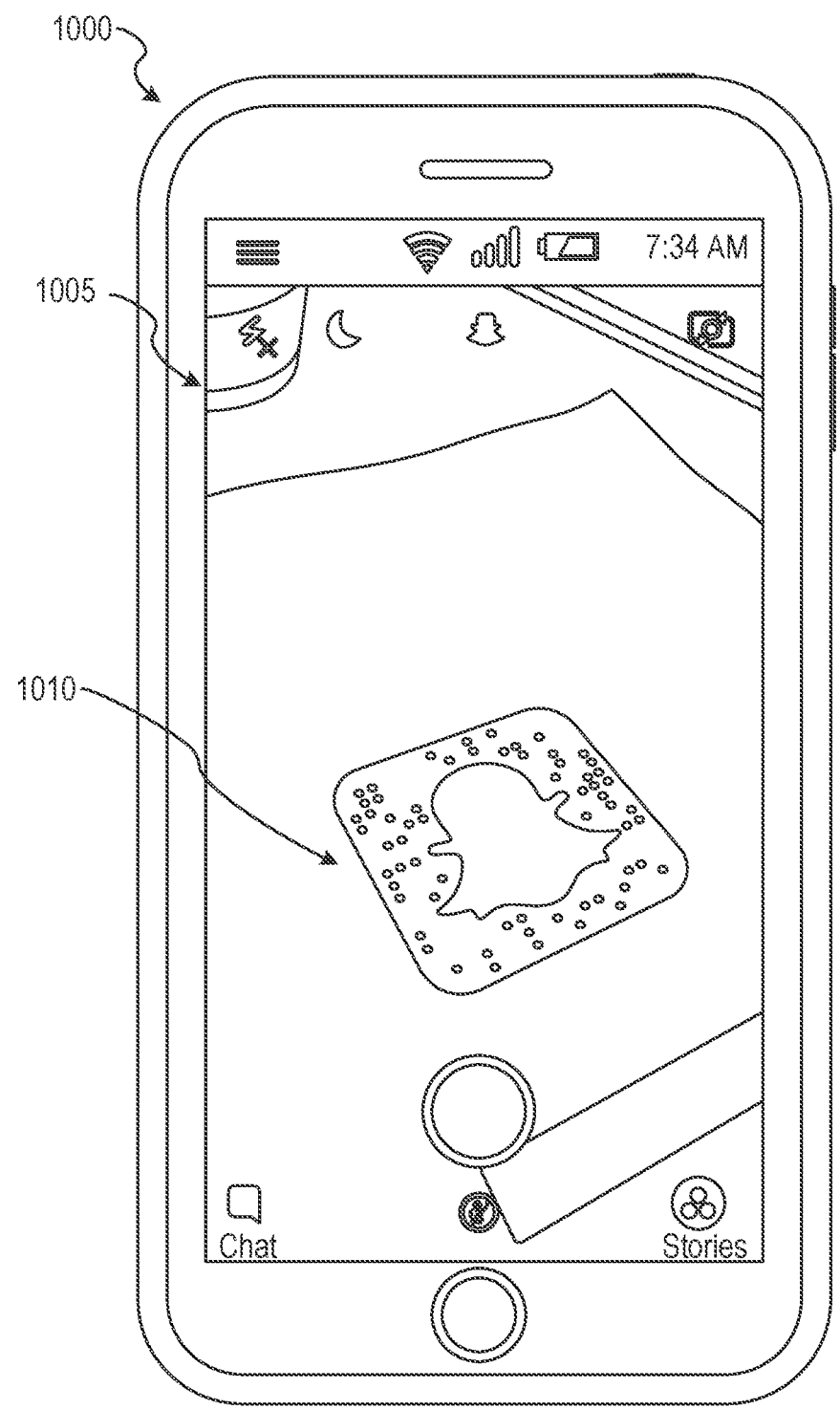
FIGS. 10A-C show an example client device implementing augmented reality using user data and coded image features, according to some example embodiments.
Figure 10B:
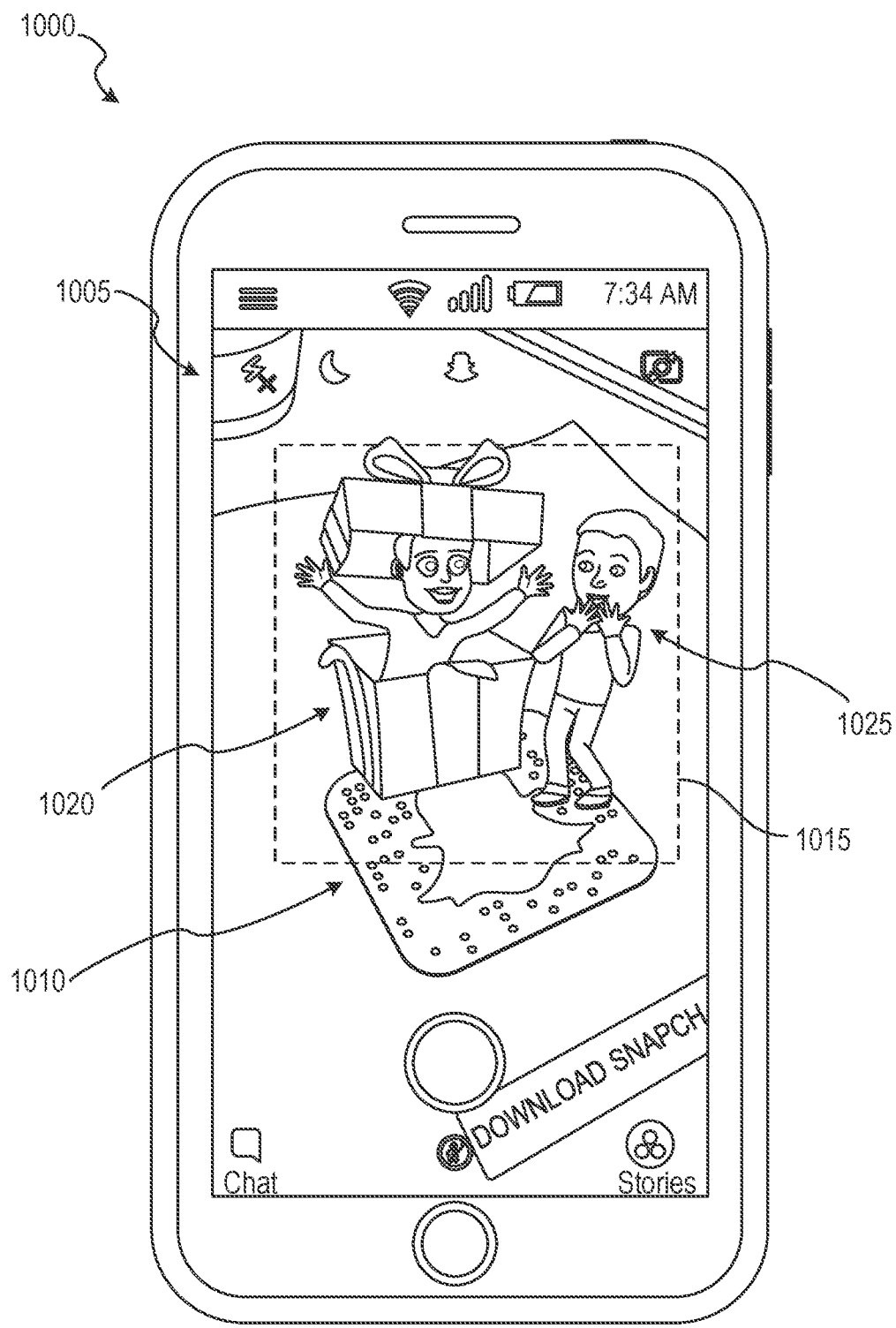
Figure 10C:
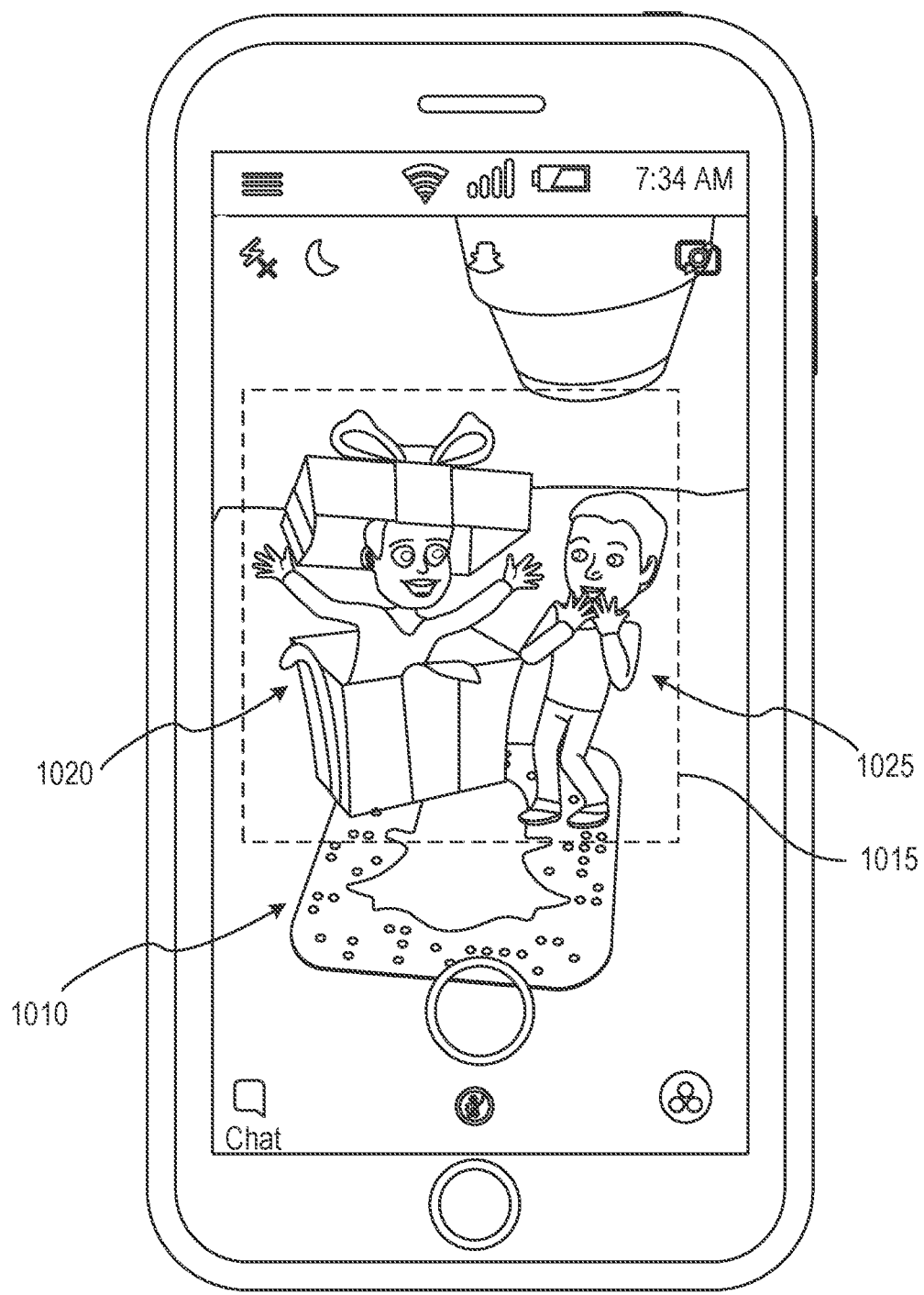

FIGS. 10A-C show an example client device 1000 implementing augmented reality using user data and coded image features, according to some example embodiments. In particular, as illustrated in the example of FIG. 10A, the client device 1000 includes a user interface 1005 that is managed by the user interface engine 610. As illustrated, the user interface 1005 is displaying a live feed of image data from an image sensor located on the backside (not depicted) of the client device 1000. The live feed comprises one or more image frames played sequentially (e.g., a live video feed). In the live feed, an image feature 1010 is depicted. The image feature 1010 is an image that the detection feature is pre-configured to recognize. Further, according to some example embodiments, the image feature has one or more dots or bars that correspond to a code language (e.g., a barcode) that identifies a user account of a user. The detection engine 620 is configured to identify the image feature 1010 and use the code (e.g., dot configuration) to identify a user account of a user. In this way, the image feature 1010 functions as an account identifier for a user.

FIG. 10B shows an example of the client device 1000 displaying a combined depiction of user data from two different users, according to some example embodiments. As illustrated, in response to the image feature 1010 being scanned and the user account of a user being identified, a combined depiction 1015 (e.g., combined avatar) is generated that depicts first user data 1020 of a first user interacting with second user data 1025 of a second user. In some example embodiments, the first user data 1020 is an avatar created by the first user (e.g., user whose user profile is identified by the code in image feature 1010) and the second user data 1025 is another avatar created by the second user (e.g., user of the client device 1000). The combined depiction 1015 is generated using a combined avatar template that specifies how each avatar should be arranged or configured so that the avatars appear to be interacting with each other.

FIG. 10C shows an example of the client device 1000 displaying a combined depiction of user data from two different users from a different perspective, according to some example embodiments. To maintain the appearance that the image feature 1010 is the source of the augmented reality elements (e.g., one or more bubbles 815 in FIG. 8B or the combined depiction 1015), tracking is implemented. In particular, for example, a tracking engine 650 is implemented to anchor the augmented reality elements to the image feature. In this way, with reference to FIG. 8B, the one or more bubbles 815 can be played as an animation that makes the image feature 810 appear as the source of the bubbles. Similarly, with reference to FIG. 10C, the combined depiction 1015 may be animated so the first avatar (e.g., user data 1020) and the cartoon present appear to pop out of the image feature 1010. Further, as illustrated in FIG. 10C, as the user (not depicted) moves the client device 1000, thereby causing the image feature 1010 to move in the live feed, the tracking engine 650 tracks the image feature location and anchors the augmented reality elements to the image feature location at a fixed position. Further, as the user rotates the client device 1000 around the image feature 1010, the tracking engine 650 can rotate the combined depiction 1015 to face the user. Further, rotation of the client device 1000 may cause the depicted augmented elements (e.g., combined depiction) to rotate in three-dimensions, animate (e.g., cartoon confetti may be depicted as falling across the user interface 1005), and so forth. In some embodiments, the augmented elements are three-dimensional models that can animate or be modified (e.g., rotated about the image feature 1010) in response to manipulation (e.g., movement) of the client device 1000.

Figure 11:
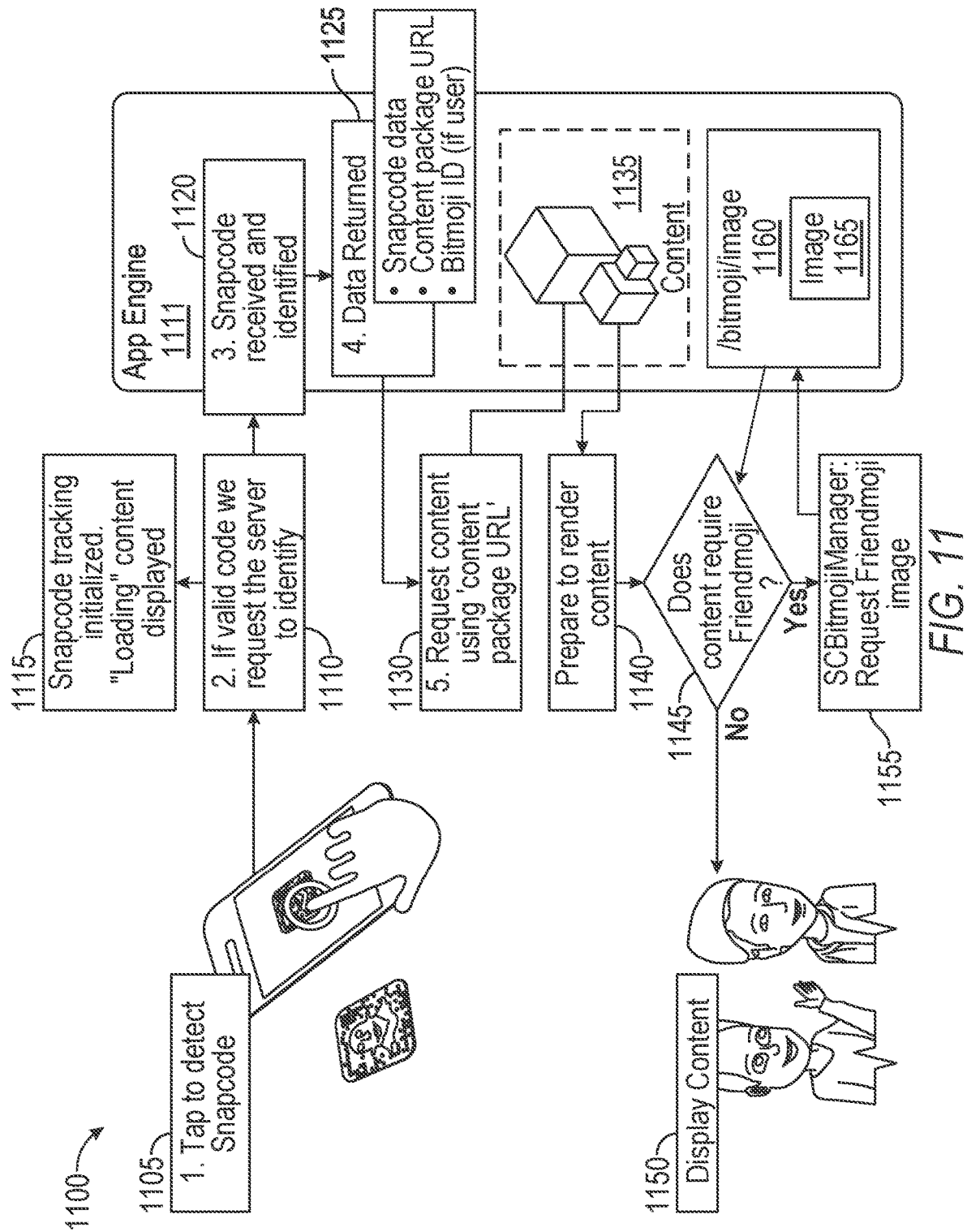
FIG. 11 shows a method for implementing augmented reality using user data and coded image features, according to some example embodiments.

FIG. 11 shows a method 1100 for implementing augmented reality using user data and coded image features, according to some example embodiments. In FIG. 11, operations performed on the application server are executed using an example of a coded vision system 250, which in FIG. 11 is labeled as a app engine 1111. The operations external to the app engine 1111 are executed on the coded vision system 250 on client device 102. At operation 1105, the coded vision system 250 detects an image feature through its image sensor. In some example embodiments, the image feature is imaged in the live feed. To trigger the detection engine 620 to scan and identify the image feature, the user performs a user action (e.g., screen tap) on the code in the live feed, according to some example embodiments. At operation 1110, the detection engine 620 runs a code checker that checks whether the code in the image feature is valid. In some example embodiments, all codes are generated using an equation or algorithm. In those embodiments, the detection engine 620 can use the equation or algorithm to check whether the code is valid. If the code is not valid, the user interface engine 610 generates an error message (e.g. "Scanned code not valid.") for display on the display screen of the client device.

If the code is valid, at operation 1115, the user interface engine 610 generates a "Loading" message for display on the client device. Further, the code from the image feature or the image feature image data is transmitted to the app engine 1111 for further processing. At operation 1120, the app engine 1111 receives the code or the image feature image data and uses it to locate a user profile of a user. The image feature is thus an identifier for the user profile account. At operation 1125, data is transmitted to the client device 102. In some embodiments, the data includes an user account identifier (e.g., "snapcode identifier"), a uniform resource locator (URL) for a content package, and a bitmoji ID, where a Bitmoji® is a name for a type of reconfigurable avatar designed by the user. Bitmoji's are accessible as part of a network platform connectable to over a network as a service. The content package may include content such as lens metadata (e.g., video filter data), that can configure the live feed to display a video effect (e.g., blur, swirl, augmented reality clouds animated to appear raining). In some embodiments, the content 1135 is accessible to the user only if the user scans a given image feature. In those embodiments, some image features may be owned/managed by a company. The company may configure a video effect to show their logo, brand name, or promotional item. Upon scanning the image feature, the company's content package may be unlocked in that that the content package URL is sent to the user device. Further, according to some example embodiments, the content includes a combined depiction template identifier.

At operation 1130, the coded vision system 250 requests the content 1135 by directing a request to the URL. In response, the app engine 1111 sends the content 1135 to the client device 102, and the client device 102 prepares to render the content at operation 1140. At operation 1145, if the content does not require a combined depiction (e.g., a "friendmoji" that shows two avatars interacting with each other), the coded vision system 250 displays the content (e.g. applies a video effect to the live feed) at operation 1150. On the other hand, if, at operation 1145, the content does require a combined depiction, then at operation 1155, the coded vision system 250 sends a request to a server target (e.g., an action engine 760 executed on app engine having an address "/bitmoji/image"), requesting the combined depiction content. In some embodiments, the request of operation includes an identifier identifying the first user account, the second user account, and the type of combined depiction content to be used. In some example embodiments, the contented displayed at operation 1150 includes one or more of: a combined avatar of the two users (e.g., a scanning user and a user whose scannable image was scanned), overlay content using images from ephemeral messages 502, or an add button (e.g., add button 820, FIG. 8B).

In some example embodiments, the client device stores a complete list of combined depiction templates and IDs, and an action engine 1160 on the app engine 1111 manages generating the combined depictions. Once the action engine 1160 generates the combined depiction 1165, it sends the combined depiction 1165 to the client device 102. The client device receives the combined depiction and anchors the combined depiction 1165 to the image feature in the live feed, as discussed above. In some example embodiments, if at operation 1145 the content requires a combined depiction, but the user associated with the image feature does not have an avatar (e.g., a Bitmoji®) configured, the action engine prepares fall back content. For example, instead of an avatar popping out of a present (as depicted in combined depiction 1165) the present can be animated as exploding with confetti.

Figure 12:
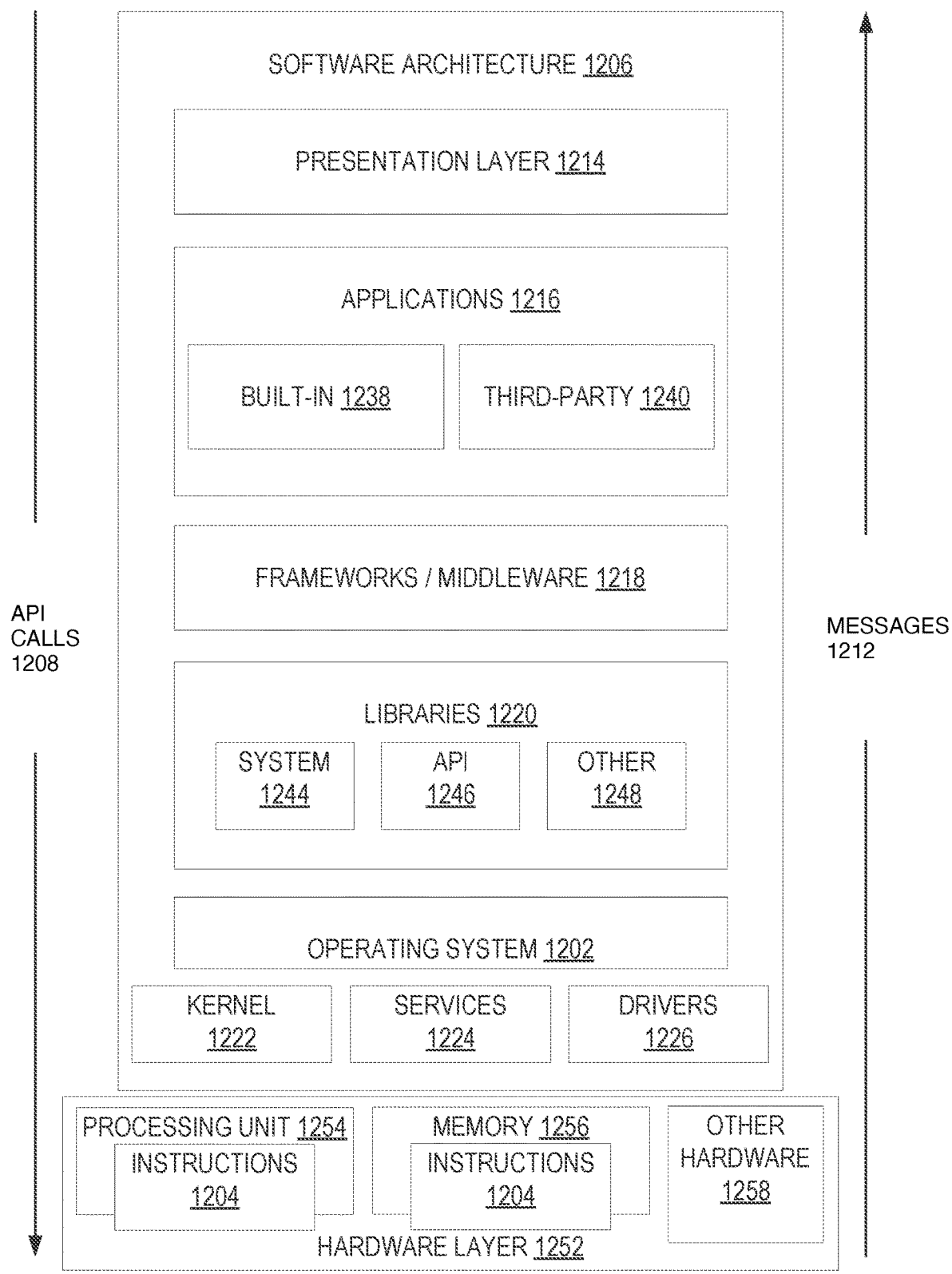
FIG. 12 is a block diagram illustrating a representative software architecture, which may be used in conjunction with various hardware architectures herein described.

FIG. 12 is a block diagram illustrating an example software architecture 1206, which may be used in conjunction with various hardware architectures herein described. FIG. 12 is a non-limiting example of a software architecture, and it will be appreciated that many other architectures may be implemented to facilitate the functionality described herein. The software architecture 1206 may execute on hardware such as a machine 1200 of FIG. 12 that includes, among other things, processors, memory, and I/O components. A representative hardware layer 1252 is illustrated and can represent, for example, the machine 1200 of FIG. 12. The representative hardware layer 1252 includes a processing unit 1254 having associated executable instructions 1204. The executable instructions represent the executable instructions of the software architecture 1206, including implementation of the methods, components, and so forth described herein. The hardware layer 1252 also includes a memory/storage 1256, which also has the executable instructions 1204. The hardware layer 1252 may also comprise other hardware 1258.

In the example architecture of FIG. 12, the software architecture 1206 may be conceptualized as a stack of layers where each layer provides particular functionality. For example, the software architecture 1206 may include layers such as an operating system 1202, libraries 1220, frameworks/middleware 1218, applications 1216, and a presentation layer 1214. Operationally, the applications 1216 and/or other components within the layers may invoke API calls 1208 through the software stack and receive a response in the form of messages 1212. The layers illustrated are representative in nature and not all software architectures have all layers. For example, some mobile or special-purpose operating systems may not provide a frameworks/middleware 1218, while others may provide such a layer. Other software architectures may include additional or different layers.

The operating system 1202 may manage hardware resources and provide common services. The operating system 1202 may include, for example, a kernel 1222, services 1224, and drivers 1226. The kernel 1222 may act as an abstraction layer between the hardware and the other software layers. For example, the kernel 1222 may be responsible for memory management, processor management (e.g., scheduling), component management, networking, security settings, and so on. The services 1224 may provide other common services for the other software layers. The drivers 1226 are responsible for controlling or interfacing with the underlying hardware. For instance, the drivers 1226 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1220 provide a common infrastructure that is used by the applications 1216 and/or other components and/or layers. The libraries 1220 provide functionality that allows other software components to perform tasks in an easier fashion than by interfacing directly with the underlying operating system 1202 functionality (e.g., kernel 1222, services 1224, and/or drivers 1226). The libraries 1220 may include system libraries 1244 (e.g., C standard library) that may provide functions such as memory allocation functions, string manipulation functions, mathematical functions, and the like. In addition, the libraries 1220 may include API libraries 1246 such as media libraries (e.g., libraries to support presentation and manipulation of various media formats such as MPEG4, H.264, MP3, AAC, AMR, JPG, or PNG), graphics libraries (e.g., an OpenGL framework that may be used to render two dimensional (2D) and three dimensional (3D) graphic content on a display), database libraries (e.g., SQLite that may provide various relational database functions), web libraries (e.g., WebKit that may provide web browsing functionality), and the like. The libraries 1220 may also include a wide variety of other libraries 1248 to provide many other APIs to the applications 1216 and other software components/modules.

The frameworks/middleware 1218 provide a higher-level common infrastructure that may be used by the applications 1216 and/or other software components/modules. For example, the frameworks/middleware 1218 may provide various graphic user interface (GUI) functions, high-level resource management, high-level location services, and so forth. The frameworks/middleware 1218 may provide a broad spectrum of other APIs that may be utilized by the applications 1216 and/or other software components/modules, some of which may be specific to a particular operating system 1202 or platform.

The applications 1216 include built-in applications 1238 and/or third-party applications 1240. Examples of representative built-in applications 1238 may include, but are not limited to, a contacts application, a browser application, a book reader application, a location application, a media application, a messaging application, and/or a game application. The third-party applications 1240 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1240 may invoke the API calls 1208 provided by the mobile operating system (such as the operating system 1202) to facilitate functionality described herein.

The applications 1216 may use built-in operating system functions (e.g., kernel 1222, services 1224, and/or drivers 1226), libraries 1220, and frameworks/middleware 1218 to create user interfaces to interact with users of the system. Alternatively, or additionally, in some systems, interactions with a user may occur through a presentation layer, such as the presentation layer 1214. In these systems, the application/component "logic" can be separated from the aspects of the application/component that interact with a user.

Figure 13:
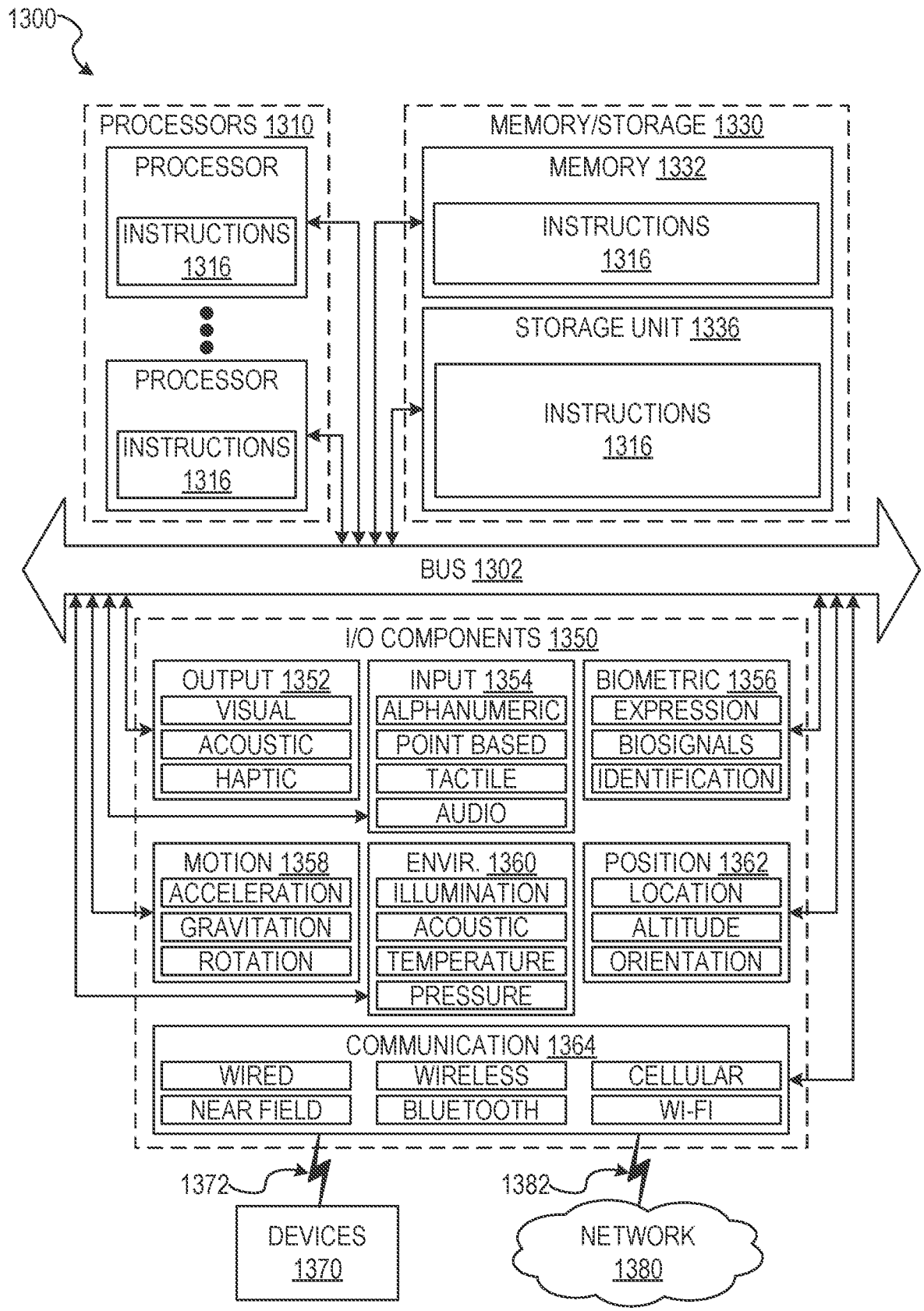
FIG. 13 is a block diagram illustrating components of a machine, according to some example embodiments, able to read instructions from a machine-readable medium (e.g., a machine-readable storage medium) and perform any one or more of the methodologies discussed herein.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. As such, the instructions 1316 may be used to implement modules or components described herein. The instructions 1316 transform the general, non-programmed machine 1300 into a particular machine programmed to carry out the described and illustrated functions in the manner described. In alternative embodiments, the machine operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines that individually or jointly execute the instructions 1316 to perform any one or more of the methodologies discussed herein.

The machine 1300 may include processors 1310, memory/storage 1330, and I/O components 1350, which may be configured to communicate with each other such as via a bus 1302. The memory/storage 1330 may include a memory 1332, such as a main memory, or other memory storage, and a storage unit 1336, both accessible to the processors 1310 such as via the bus 1302. The storage unit 1336 and memory 1332 store the instructions 1316 embodying any one or more of the methodologies or functions described herein. The instructions 1316 may also reside, completely or partially, within the memory 1332, within the storage unit 1336, within at least one of the processors 1310 (e.g., within the processor's cache memory), or any suitable combination thereof, during execution thereof by the machine 1300. Accordingly, the memory 1332, the storage unit 1336, and the memory of the processors 1310 are examples of machine-readable media.

The I/O components 1350 may include a wide variety of components to receive input, provide output, produce output, transmit information, exchange information, capture measurements, and so on. The specific I/O components 1350 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1350 may include many other components that are not shown in FIG. 13. The I/O components 1350 are grouped according to functionality merely for simplifying the following discussion and the grouping is in no way limiting. In various example embodiments, the I/O components 1350 may include output components 1352 and input components 1354. The output components 1352 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1354 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1350 may include biometric components 1356, motion components 1358, environment components 1360, or position components 1362 among a wide array of other components. For example, the biometric components 1356 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1358 may include acceleration sensor components (e.g., accelerometer), gravitation sensor components, rotation sensor components (e.g., gyroscope), and so forth. The environment components 1360 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1362 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1350 may include communication components 1364 operable to couple the machine 1300 to a network or devices 1370 via a coupling 1382 and a coupling 1372, respectively. For example, the communication components 1364 may include a network interface component or other suitable device to interface with the network 1380. In further examples, the communication components 1364 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1370 may be another machine or any of a wide variety of peripheral devices (e.g., a peripheral device coupled via a USB).

Moreover, the communication components 1364 may detect identifiers or include components operable to detect identifiers. For example, the communication components 1364 may include Radio Frequency Identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF413, Ultra Code, UCC RSS-2D barcode, and other optical codes), or acoustic detection components (e.g., microphones to identify tagged audio signals). In addition, a variety of information may be derived via the communication components 1364, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible media to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EMPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, a device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application-Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred (for example, giving date and time of day, sometimes accurate to a small fraction of a second).

What is claimed is:

1. A method comprising:
    identifying an image feature in a live feed from an image sensor of a device of a second user;
    identifying a first user based on the image feature, the image feature being an identifier of a first user account on a social network application, the first user account belonging to the first user;
    accessing image post data of the first user, the image post data comprising a plurality of images from ephemeral messages published by the first user account on the social network application; and
    generating an animation sequence of a plurality of virtual objects emanating from the image feature, each virtual object populated with one of the plurality of images.

2. The method of claim 1, further comprising:
    displaying, in a display of the device, the animation sequence as an overlay to the live feed from the image sensor of the device.

3. The method of claim 2, wherein the animation sequence is anchored to the image feature in the live feed.

4. The method of claim 3, wherein the animation sequence depicts a plurality of bubbles as emanating from the image feature, wherein each bubble is populated with one of the plurality of images.

5. The method of claim 1, further comprising:
    generating an add button overlay to the live feed, the add button overlay appearing anchored to the image feature in the live feed,
    wherein the add button overlay, when selected, is configured to connect the first user account with a second user account on the social network application, the second user account belonging to the second user.

6. The method of claim 5, further comprising:
    detecting a selection of the add button overlay by the second user at the device;
    in response to detecting the selection of the add button overlay by the second user at the device, determining whether the first user account includes avatar data of the first user;
    in response determining that the first user account includes avatar data of the first user, accessing, from a server of the social network application, the avatar data of the first user and avatar data of the second user;
    generating a combined avatar that displays the avatar data of the first user with avatar data of the second user; and
    displaying, on the device, the combined avatar overlaid on the image feature in the live feed, the combined avatar being anchored to the image feature.

7. The method of claim 6, wherein the combined avatar is generated from a combined avatar template that arranges the avatar data of the first user and the avatar data of the second user into a predefined configuration.

8. The method of claim 6, further comprising:
    generating an electronic message for transmission to the first user account, the electronic message comprising the combined avatar; and
    transmitting, to the second user account, the electronic message comprising the combined avatar.

9. The method of claim 8, wherein the electronic message is an ephemeral message that automatically expires after a specified time duration such that the ephemeral message is no longer accessible through the social network application after expiration.

10. The method of claim 1, further comprising:
    determining whether the first user account of the first user and a second user account of the second user are connected as friends on the social network application;
    in response to determining that the first user account and the second user account are connected as friends on the social network application, accessing avatar data of the first user and avatar data of the second user;
    generating a combined avatar that displays the avatar data of the first user with avatar data of the second user; and displaying, on the device of the second user, the combined avatar overlaid on the image feature in the live feed, the combined avatar being anchored to the image feature.

11. A device comprising:

one or more processors;

a display; and a memory storing instructions that, when executed by the one or more processors, cause the device to perform operations comprising:

identifying an image feature in a live feed from an image sensor of a device of a second user;

identifying a first user based on the image feature, the image feature being an identifier of a first user account on a social network application, the first user account belonging to a first user;

accessing image post data of the first user, the image post data comprising a plurality of images from ephemeral messages published by the first user account on the social network application; and generating an animation sequence of a plurality of virtual objects emanating from the image feature, each virtual object populated with one of the plurality of images.

12. The device of claim 11, wherein the operations further comprise:

displaying, in the display of the device, the animation sequence as an overlay to the live feed from the image sensor of the device.

13. The device of claim 12, wherein the animation sequence is anchored to the image feature in the live feed.

14. The device of claim 13, wherein the animation sequence depicts a plurality of bubbles as emanating from the image feature, wherein each bubble is populated with one of the plurality of images.

15. The device of claim 11, wherein the operations further comprise:

generating an add button overlay to the live feed, the add button overlay appearing anchored to the image feature in the live feed, wherein the add button overlay, when selected, is configured to connect the first user account with a second user account on the social network application, the second user account belonging to the second user.

16. The device of claim 15, wherein the operations further comprise:

detecting a selection of the add button overlay by the second user at the device;

in response to detecting the selection of the add button overlay by the second user at the device, determining whether the first user account includes avatar data of the first user;

in response determining that the first user account includes avatar data of the first user, accessing, from a server of the social network application, the avatar data of the first user;

accessing avatar data of the second user;

generating a combined avatar that displays the avatar data of the first user with avatar data of the second user; and displaying, on the device of the second user, the combined avatar overlaid on the image feature in the live feed, the combined avatar being anchored to the image feature.

17. The device of claim 16, wherein the combined avatar is generated from a combined avatar template that arranges the avatar data of the first user and the avatar data of the second user into a predefined configuration.

18. The device of claim 16, wherein the operations further comprise:

generating an electronic message for transmission to the first user account, the electronic message comprising the combined avatar; and transmitting, to the second user account, the electronic message comprising the combined avatar.

19. The device of claim 18, wherein the electronic message is an ephemeral message that automatically expires after a specified time duration such that the ephemeral message is no longer accessible through the social network application after expiration.

20. A non-transitory machine-readable storage device embodying instructions that, when executed by a device, cause the device to perform operations comprising:

identifying an image feature in a live feed from an image sensor of the device of a second user;

identifying a first user based on the image feature, the image feature being an identifier of a first user account on a social network application, the first user account belonging to the first user;

accessing image post data of the first user, the image post data comprising a plurality of images from ephemeral messages published by the first user account on the social network application; and generating an animation sequence of a plurality of virtual objects emanating from the image feature, each virtual object populated with one of the plurality of images.

* * * * *